US012528014B2

(12) United States Patent
Baba

(10) Patent No.: US 12,528,014 B2
(45) Date of Patent: Jan. 20, 2026

(54) METHOD, COMPUTER READABLE MEDIUM, AND INFORMATION PROCESSING DEVICE

(71) Applicant: COLOPL, Inc., Tokyo (JP)

(72) Inventor: Naruatsu Baba, Tokyo (JP)

(73) Assignee: COLOPL, Inc., Tokyo (JP)

( * ) Notice: Subject to any disclaimer, the term of this patent is extended or adjusted under 35 U.S.C. 154(b) by 417 days.

(21) Appl. No.: 18/166,449

(22) Filed: Feb. 8, 2023

(65) Prior Publication Data

US 2023/0191252 A1 Jun. 22, 2023

Related U.S. Application Data

(63) Continuation of application No. PCT/JP2020/034850, filed on Sep. 15, 2020.

(30) Foreign Application Priority Data

Aug. 13, 2020 (JP) ................................ 2020-136561

(51) Int. Cl.
*A63F 13/55* (2014.01)
*A63F 13/213* (2014.01)
*A63F 13/215* (2014.01)

(52) U.S. Cl.
CPC ............ *A63F 13/55* (2014.09); *A63F 13/213* (2014.09); *A63F 13/215* (2014.09)

(58) Field of Classification Search
None
See application file for complete search history.

(56) References Cited

U.S. PATENT DOCUMENTS 5,393,071 A * 2/1995 Best ...................... A63F 13/822
5,393,072 A * 2/1995 Best ..................... G11B 27/105
(Continued)

FOREIGN PATENT DOCUMENTS

JP 2010246650 A 11/2010
JP 2012110670 A 6/2012
(Continued)

OTHER PUBLICATIONS

English translation of JP 6595043 B1 by IP.com (Year: 2019).*
(Continued)

*Primary Examiner* — Seng H Lim

(57) ABSTRACT

A method for advancement of a game by a computer having a processor, a memory, and a manipulation unit, the method comprising, by the processor, executing advancement of a first part by operating an NPC which is not a direct manipulation target by a user who is a game player, based on first operation instruction data prestored in the memory for specifying an operation of the NPC, and by responding to an input manipulation of the user, accepting a particular action by the user in the first part, the game being switched from the first part to a second part according to a result of the particular action, and executing first advancement of the second part by operating the NPC based on second operation instruction data distributed from an external device, the second operation instruction data including motion data and audio data input by an operator associated with the NPC.

20 Claims, 14 Drawing Sheets

(56) References Cited

U.S. PATENT DOCUMENTS

| | | | | |
|---|---|---|---|---|
| 8,284,157 | B2 * | 10/2012 | Markovic | G06F 3/017 715/706 |
| 2012/0326976 | A1 | 12/2012 | Markovic | |
| 2014/0364206 | A1 | 12/2014 | Shiraiwa | |
| 2016/0275643 | A1 * | 9/2016 | Sato | G06T 19/20 |
| 2016/0275717 | A1 * | 9/2016 | Mizoguchi | A63F 13/577 |
| 2019/0394303 | A1 | 12/2019 | Marr | |
| 2020/0338450 | A1 * | 10/2020 | Parr | A63F 13/35 |
| 2021/0211632 | A1 | 7/2021 | Kawakami | |
| 2022/0309364 | A1 * | 9/2022 | Perry | A63F 13/56 |

FOREIGN PATENT DOCUMENTS

| | | | |
|---|---|---|---|
| JP | 2014008067 | A | 1/2014 |
| JP | 2015013101 | A | 1/2015 |
| JP | 2018011850 | A | 1/2018 |
| JP | 6595043 | B1 * | 10/2019 |
| JP | 2019181268 | A | 10/2019 |
| JP | 2020017242 | A | 1/2020 |
| JP | 2020037028 | A | 3/2020 |
| JP | 2020049286 | A | 4/2020 |
| JP | 6722320 | B1 | 7/2020 |
| JP | 2020103939 | A | 7/2020 |
| JP | 2020110376 | A | 7/2020 |
| JP | 6737941 | B1 | 8/2020 |
| WO | 2014100770 | A2 | 6/2014 |
| WO | 2015093612 | A1 | 6/2015 |

OTHER PUBLICATIONS

Office Action issued for counterpart Chinese Application 202080104061.6, issued by The State Intellectual Property Office of People's Republic of China on Feb. 22, 2025.

Office Action issued for counterpart Japanese Application No. 2021-123393, transmitted from the Japanese Patent Office on Apr. 22, 2024 (drafted on Apr. 12, 2024).

Yukiyuu Channel, [Orgal] VR hot topic! Alternative Girls live broadcast starts!, Youtube [Online] [Video], Jul. 26, 2016, <URL: https://www.youtube.com/watch?v=EukHxHq8cT0>.

Ogata et al., QualiArts "Alternative Girls" pursues a "50cm distance" in VR space, AUTODESK :: Area Japan [online], May 12, 2017, <URL: https://area.autodesk.jp/case/game/cyberagent>.

Dengeki Online—Game, Application, Manga, Anime Information website, [online], Kadokawa Corporation, Jul. 11, 2010 [Accessed on May 8, 2018], Internet (URL: http://dengekionline.com/elem/000/000/279/279193/index-2. html).

Office Action issued for counterpart Japanese Application No. 2020-136561, issued by the Japanese Patent Office on Nov. 30, 2020 (drafted on Nov. 25, 2020).

Office Action issued for counterpart Japanese Application No. 2020-136561, issued by the Japanese Patent Office on Mar. 5, 2021 (drafted on Mar. 1, 2021).

International Search Report and (ISA/237) Written Opinion of the International Search Authority for International Patent Application No. PCT/JP2020/034850, mailed by the Japan Patent Office on Dec. 8, 2020.

Office Action issued for related Japanese Application No. 2018-102679, issued by the Japanese Patent Office on Nov. 13, 2018 (drafted on Oct. 31, 2018).

Gran Turismo Sport, The longed-for car life of traveling the world with your favorite car, Entertainmentstation Online, Dec. 1, 2017, searched on Oct. 3, 2018, URL https://entertainmentstation.jp/14789.

Kazuhiro Namibara et al., A 3D-CG Transmitting Method over Network for Virtual Space, The Institute of Electronics, Information and Communication Engineers technical search report, vol. 99, No. 251, Aug. 4, 1999, pp. 103-110.

Revealing the backside of Vtubers that you can see every day! AniCast! Until Shinonome Megu-chan's magic is made, Unite Tokyo 2018, Inside online, May 12, 2018, searched on Oct. 30, 2018, URL: https://www.inside-games.ip/artcle/2018/05/12/114639.html.

Showroom conditions of "content to survive" talked by the founder, IT Media Business Online, Apr. 13, 2018, searched on Oct. 30, 2018, URL: http://www.itmedia.co.jp/business/articles/1804/13news052.html.

Waiwai Virtual YouTuber, CG World, vol. 237 Japan, Born Dgital INC, May 10, 2018, pp. 034-039.

Office Action issued for related Japanese Application No. 2018-102679, issued by the Japanese Patent Office on May 28, 2019 (drafted on May 20, 2019).

Office Action issued for counterpart Japanese Application No. 2021-123393, transmitted from the Japanese Patent Office on Sep. 26, 2024 (drafted on Sep. 19, 2024).

Extended European Search Report for counterpart European Application No. 20949561.3, issued by the European Patent Office on Aug. 7, 2024.

* cited by examiner

| | | | | |
|---|---|---|---|---|
| CHARACTER ID | VOICE | MOTION | DESTINATION | CREATION SOURCE |

*FIG.4*

| PLAY HISTORY | | ITEM | RELATIONSHIP | FAMILIARITY | DISTRIBUTION HISTORY |
|---|---|---|---|---|---|
| FIXED SCENARIO | ACQUIRED SCENARIO | | | | |

*FIG.5*

| | | | |
|---|---|---|---|
| USER ID | ACTION DURATION | ACTION TYPE | ACTION DETAIL |

*FIG. 13*

METHOD, COMPUTER READABLE MEDIUM, AND INFORMATION PROCESSING DEVICE

BACKGROUND

1. Technical Field

The present disclosure relates to a method, a computer readable medium, and an information processing device.

2. Related Art

Traditionally, a game is widely known in which the story advances such that the ending is different according to the choices selected by the user. For example, a dating simulation game mainly aiming at virtually deepening friendship with a girl character is disclosed in non-patent document 1. The story advances by repeating of the user selecting, among the presented choices, one that they believe to be the most suitable as an action toward the character, and said character reacting to the action.

PRIOR ART DOCUMENTS

Non-Patent Document

Non-Patent Document 1: "Dengeki Online—Game, Application, Manga, Anime Information website", [online], KADOKAWA CORPORATION, [Accessed on May 8, 2018], Internet (URL: http://dengekionline.com/elem/000/000/279/279193/index-2.html)

In the game disclosed in non-patent document 1, the response pattern of the character is prepared in advance. According to the input manipulation of the user, the response of said character is decided from among said response patterns to be output, so that the game advances. Therefore, the variation of the operation of the character will not exceed beyond the content of the data that is prepared in advance. Therefore, there is a problem that, through the interaction with the character, the user cannot experience a sense of reality as if said character exists in the real world, and will eventually become bored. In general, for games developed with an intention to be played long by users, it is critical to address the issue of the user becoming bored with the game. Games are required to always provide attractive contents to motivate users to play. In particular, in games in which the user finds amusement in the interaction with the character, the character preferably has a high sense of reality such that the user can be immersed in the game world.

BRIEF DESCRIPTION OF THE DRAWINGS

FIG. 4 illustrates an example of a data structure of operation instruction data.

FIG. 5 illustrates an example of a data structure of gaming information.

FIG. 13 illustrates an example of a data structure of user action history information of a live distribution part.

DESCRIPTION OF EXEMPLARY EMBODIMENTS

Embodiment 1

A game system according to the present disclosure is a system for providing a game to a plurality of users who are game players. Hereinafter, the game system will be described with reference to the drawings. Note that the present invention is not limited to these exemplifications and is illustrated in the scope of claims, and all alterations within a meaning and a range equivalent to the scope of claims are intended to be included in the present invention. In the following description, a same reference sign is assigned to a same element in the description of the drawings, and a duplicated description will not be repeated.

[Hardware Configuration of Game System 1]

Figure 1:
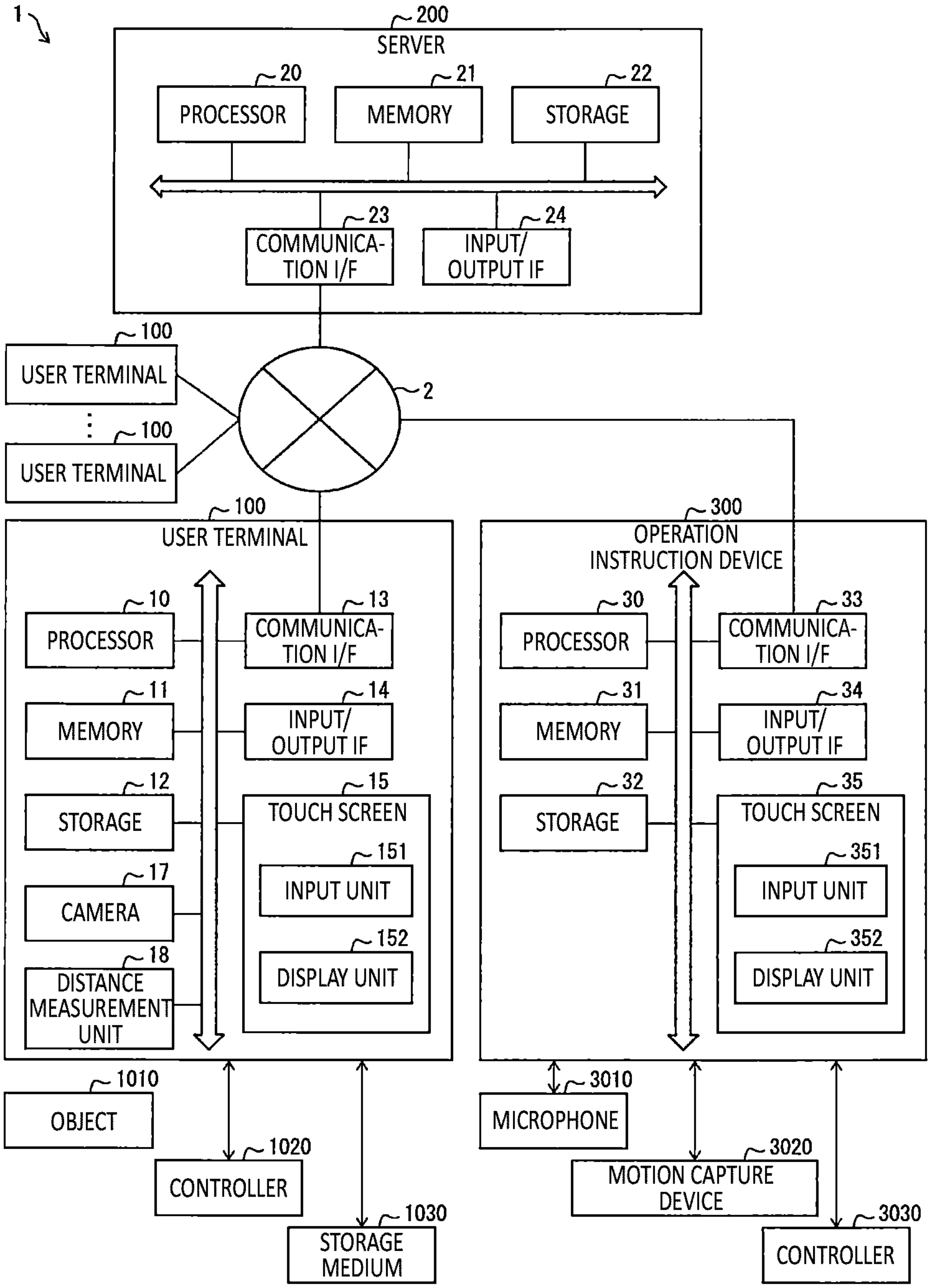
FIG. 1 illustrates a hardware configuration of a game system.

FIG. 1 illustrates a hardware configuration of a game system 1. The game system 1 includes a plurality of user terminals 100 and a server 200, as illustrated. Each user terminal 100 connects to the server 200 via a network 2. The network 2 is configured by the Internet and various types of mobile communication systems and the like constituted by radio base stations which are not illustrated in the drawing. Examples of this mobile communication system include, for example, so-called 3G and 4G mobile communication systems, Long Term Evolution (LTE), a wireless network connectable to the Internet by a predetermined access point (for example, Wi-Fi (registered trademark)), and the like.

The server 200 (a computer or information processing device) may be a general computer such as a work station or a personal computer. The server 200 includes a processor 20, a memory 21, a storage 22, a communication IF 23, and an input and output IF 24. These components included in the server 200 are electrically connected to each other by a communication bus.

The user terminal 100 (a computer or an information processing device) may be a portable terminal such as a smart phone, a feature phone, a PDA (personal digital assistant), or a tablet-type computer. The user terminal 100 may be a gaming device that is suitable for game play. The user terminal 100 includes a processor 10, a memory 11, a storage 12, a communication interface (IF) 13, an input and output IF 14, a touch screen 15 (display unit), a camera 17, and a distance measuring sensor 18, as illustrated. These components included in the user terminal 100 are electrically connected to each other by a communication bus. Note that, the user terminal 100 may include an input and output IF 14 to which a display (display unit) that is configured separately from the user terminal 100 itself can be connected, instead of or in addition to the touch screen 15.

In addition, as shown in FIG. 1, the user terminal 100 may be configured to be capable of communicating with one or more controllers 1020. A controller 1020 establishes communication with the user terminal 100 in accordance with a communication standard such as Bluetooth (registered trademark), for example. The controller 1020 may have one or more buttons or the like, and transmits, to the user terminal 100, an output value based on an input manipulation of the user on said button or the like. In addition, the controller 1020 may have various types of sensors such as an acceleration sensor and an angular rate sensor, and transmits the output value of said various types of sensors to the user terminal 100.

Note that, instead of or in addition to the user terminal 100 including the camera 17 and the distance measuring sensor 18, the controller 1020 may have the camera 17 and the distance measuring sensor 18.

The user terminal 100 desirably causes a user who uses the controller 1020 to input user identification information such as the name or log in ID of said user via the controller 1020, when starting the game, for example. In this manner, the user terminal 100 becomes capable of associating the controller 1020 with the user, to be able to identify which user said output value belongs to based on the transmission source (controller 1020) of the received output value.

In a case where the user terminal 100 communicates with a plurality of controllers 1020, each user grasps each controller 1020 such that multi-play can be achieved with said one user terminal 100 without communicating with another device such as the server 200 via the network 2. In addition, each user terminal 100 is in communication connection (in communication connection without the server 200) with each other through a wireless standard such as the wireless LAN (local area network) standard, which enables multi-play to be achieved locally by a plurality of user terminals 100. In a case where multi-play described above is achieved locally with one user terminal 100, the user terminal 100 may further include at least a part of various functionalities of the server 200 described below. In addition, in a case where multi-play described above is achieved locally with a plurality of user terminals 100, the plurality of user terminals 100 may include various functionalities of the server 200 described below in a distributed manner.

Note that, even when locally achieving multi-play described above, the user terminal 100 may perform communication with the server 200. For example, information indicating a play result such as a score or winning/losing in a certain game may be transmitted to the server 200 in association with the user identification information.

In addition, the controller 1020 may be configured to be attachable/detachable to/from the user terminal 100. In this case, a coupling portion with the controller 1020 may be provided on at least any of the surface in the housing of the user terminal 100. In a case where the user terminal 100 and the controller 1020 are coupled in a wired manner via said coupling portion, the user terminal 100 and the controller 1020 transmits and receives signals via the wire.

As shown in FIG. 1, the user terminal 100 may accept mounting of a storage media 1030 such as an external memory card via the input and output IF 14. In this manner, the user terminal 100 can read program and data recorded on the storage media 1030. The program to be recorded on the storage medium 1030 is, for example, a game program.

The user terminal 100 may store, in the memory 11 of the user terminal 100, a game program acquired by communicating with an external device such as the server 200, or may store, in the memory 11, a game program acquired by reading from the storage media 1030.

As described above, the user terminal 100 includes the communication IF 13, the input and output IF 14, the touch screen 15, the camera 17, and the distance measuring sensor 18, as examples of mechanisms for inputting information to said user terminal 100. Each of the units described above as the input mechanism can be regarded as an manipulation unit configured to accept the input manipulation by the user.

For example, in a case where the manipulation unit is constituted by at least either one of the camera 17 and the distance measuring sensor 18, said manipulation unit detects an object 1010 near the user terminal 100, and identifies an input manipulation from the detection result of said object. As an example, a hand of the user, a marker of a predetermined shape, or the like is detected as the object 1010, and the input manipulation is identified based on a color, a shape, a motion, a type, or the like of the object 1010 which is obtained as a detection result. More specifically, when the user's hand is detected from the captured image of the camera 17, the user terminal 100 identifies and accepts the gesture (a series of motion of the user's hand) detected based on said captured image, as the input manipulation of the user. Note that the captured image may be a still image or a moving image.

Alternatively, in a case where the manipulation unit is constituted by the touch screen 15, the user terminal 100 identifies and accepts the manipulation of the user performed on the input unit 151 of the touch screen 15 as the input manipulation of the user. Alternatively, in a case where the manipulation unit is constituted by the communication IF 13, the user terminal 100 identifies and accepts a signal (for example, an output value) transmitted from the controller 1020 as the input manipulation of the user. Alternatively, when the manipulation unit is constituted by the input and output IF 14, the terminal apparatus 100 identifies and accepts, as the input manipulation by the user, a signal output from an input apparatus (not illustrated in the drawing) which is different from the controller 1020 connected to the input and output IF 14.

In the present embodiment, the game system 1 further includes an operation instruction device 300. The operation instruction device 300 connects to each of the server 200 and the user terminal 100 via the network 2. At least one operation instruction device 300 is provided in the game system 1. A plurality of operation instruction device 300 may be provided according to the number of user terminals 100 that utilizes the service provided by the server 200. One operation instruction device 300 may be provided for one user terminal 100. One operation instruction device 300 may be provided for a plurality of user terminals 100.

The operation instruction device 300 (NPC control device, character control device) may be a computer such as a server, a desktop computer, a laptop computer, or a tablet, and a computer group including a combination thereof. As illustrated, the operation instruction device 300 includes a processor 30, a memory 31, a storage 32, a communication IF 33, an input and output IF 34, and a touch screen 35 (display unit). These components included in the operation instruction device 300 are electrically connected to each other by a communication bus. Note that, the operation instruction device 300 may include an input and output IF 34 that is capable of connecting a display (display unit) that is configured separately from the operation instruction device 300 itself, instead of or in addition to the touch screen 35.

In addition, as shown in FIG. 1, the operation instruction device 300 may be configured to be capable of communicating with a peripheral apparatus such as one or more microphones 3010, one or more motion capture devices 3020, and one or more controllers 3030 in a wireless or wired manner. The peripheral apparatus connected in a wireless manner establishes communication with the operation instruction device 300 in accordance with a communication standard such as Bluetooth (registered trademark), for example.

The microphone 3010 acquires a voice generated in the surrounding, and converts the same into an electric signal. The voice converted to an electric signal is transmitted to the operation instruction device 300 as audio data, and accepted by the operation instruction device 300 via the communication IF 33.

The motion capture device 3020 tracks motion (including facial expression, movement of the mouth or the like) of a tracking target (for example, a person), and transmits an output value as the tracking result to the operation instruction device 300. Motion data, which is the output value, is accepted by the operation instruction device 300 via the communication IF 33. The form of motion capture of the motion capture device 3020 is not particularly limited. The motion capture device 3020 optionally includes any mechanism for capturing motion, such as a camera, various types of sensors, a marker, a suit worn by a model (person), a signal emitter, according to the form adopted.

The controller 3030 may have a physical input mechanism such as one or more buttons, levers, sticks, wheels. The controller 3030 transmits, to the operation instruction device 300, an output value based on the input manipulation input by an operator of the operation instruction device 300 to said input mechanism. In addition, the controller 3030 may have various types of sensors such as an acceleration sensor and an angular rate sensor, and may transmit the output value of said various types of sensors to the operation instruction device 300. The output value described above is accepted by the operation instruction device 300 via the communication IF 33. Note that, hereinafter, a person, who performs some kind of input manipulation on the operation instruction device 300 by using a manipulation unit included in the operation instruction device 300 or various types of input mechanism that is communicatively connected to the operation instruction device 300, is referred to as an operator. The operator also includes a person who manipulates the operation instruction device 300 by using the input unit 351, the controller 3030 or the like, a voice actor who inputs a voice via the microphone 3010, and a model who inputs movements via the motion capture device 3020. Note that, the operator is not included in the user who is the game player.

The operation instruction device 300 may include a camera and a distance measuring sensor that are not illustrated. Instead of, or in addition to being included in the operation instruction device 300, the camera and the distance measuring sensor may be included in the motion capture device 3020 and the controller 3030.

As described above, the operation instruction device 300 includes the communication IF 33, the input and output IF 34, and touch screen 35, as examples of a mechanism for inputting information to said operation instruction device 300. The operation instruction device 300 may further include a camera and a distance measuring sensor, as required. Each of the units described above as the input mechanism can be regarded as an manipulation unit configured to accept the input manipulation by the user.

The manipulation unit may be constituted by the touch screen 35. In this case, the operation instruction device 300 identifies and accepts the manipulation of the user performed on the input unit 351 of the touch screen 35 as the input manipulation of the user. Alternatively, in a case where the manipulation unit is constituted by the communication IF 33, the operation instruction device 300 identifies and accepts a signal (for example, an output value) transmitted from the controller 3030 as the input manipulation of the user. Alternatively, when the manipulation unit is constituted by the input and output IF 34, the terminal apparatus 100 identifies and accepts, as the input manipulation by the user, a signal output from an input apparatus (not illustrated in the drawing) which is different from the controller 3030 connected to the input and output IF 34.

[Game Overview]

The game (hereinafter, the present game) executed by the game system 1 according to embodiment 1 is a game in which one or more characters appear, and at least one of those characters is operated based on operation instruction data. The character that makes appearance in said game may be a player character (hereinafter, PC) or may be a non player character (hereinafter, NPC). The PC is a character that the user who is the game player can directly manipulate. The NPC is a character that operates in accordance with the game program and the operation instruction data, that is, a character that the user who is the game player cannot directly manipulate. Hereinafter, “character” will be used collectively when it is not necessary to particularly distinguish between the two.

As an example, the present game is a life simulation game. Specifically, the purpose of said life simulation game is for the main character played by the user to work with a character by enhancing its interaction therewith, thereby turning said character into a famous moving image distributor to achieve said character’s dream. Further, said life simulation game may include an element of a dating simulation game aiming at the main character enhancing their relationship of with the character through interaction.

Further, the present game preferably at least includes a live distribution part, as an example. In the game system 1, operation instruction data is supplied to the user terminal 100 that is executing the present game at any timing from another device other than said user terminal 100. The user terminal 100 is triggered by reception of said operation instruction data to analyze (render) said operation instruction data. The live distribution part refers to a part where the user terminal 100 presents a character that operates in accordance with the analyzed operation instruction data described above to the user in real-time. In this manner, the user can feel a sense of reality as if the character really exists, and can further immerse in the game world to enjoy the present game.

In the present embodiment, the game may be constituted by a plurality of playing parts. In this case, a character may have different characteristics in each part, such that it is a PC in one part and is an NPC in another part.

The game genre is not limited to a particular genre. The game system 1 may execute a game of any genre. For example, it may be a game based on sports, such as tennis, table tennis, dodge ball, baseball, soccer, and hockey, a puzzle game, a quiz game, an RPG (role-playing game), an adventure game, a shooting game, a simulation game, a caring game, an action game, and the like.

In addition, the playing mode of the game executed at the game system 1 is not limited to a particular playing mode. The game system 1 may execute a game of any playing mode. For example, it may be a single-play game for a single user, and a multi-play game for a plurality of users, or, among multi-play games, a battle game in which a plurality of users battle against each other, a cooperative playing game in which a plurality of users cooperates with each other, and the like.

[Hardware Component of Each Device]

The processor 10 controls an entire operation of the user terminal 100. The processor 20 is configured to control an entire operation of the server 200. The processor 30 controls an entire operation of the operation instruction device 300. The processors 10, 20, and 30 include a CPU (central processing unit), a MPU (micro processing unit), and a GPU (graphics processing unit).

The processor 10 reads programs from the storage 12 described below to be developed onto the memory 11 described below. The processor 20 reads programs from the storage 22 described below to be developed onto the memory 21 described below. The processor 30 reads programs from the storage 32 described below to be developed onto the memory 31 described below. The processor 10, the processor 20, and the processor 30 execute the developed programs.

The memories 11, 21, and 31 are main storage devices. The memories 11, 21, and 31 are constituted by storage devices such as a ROM (read only memory) and a RAM (random access memory). The memory 11 temporarily stores the programs and various types of data read from the storage 12 described below by the processor 10 to provide a working area to the processor 10. The memory 11 also temporarily stores various types of data generated while the processor 10 operates according to the programs. The memory 21 temporarily stores the various types of programs and data read from the storage 22 described below by the processor 20 to provide a working area to the processor 20. The memory 21 also temporarily stores various types of data generated while the processor 20 operates according to the programs. The memory 31 temporarily stores the various types of programs and data read from the storage 32 described below by the processor 30 to provide a working area to the processor 30. The memory 31 also temporarily stores various types of data generated while the processor 30 operates according to the programs.

In the present embodiment, a program may be a game program for achieving a game with the user terminal 100. Alternatively, said program may be a game program for achieving said game by cooperation between the user terminal 100 and the server 200. Alternatively, said program may be a game program for achieving said game by cooperation between the user terminal 100, the server 200, and the operation instruction device 300. Note that, a game that is achieved through cooperation between the user terminal 100 and the server 200 and a game that is achieved through cooperation between the user terminal 100 and the server 200 and the operation instruction device 300 may be a game that is executed on a browser that is activated on the user terminal 100, as an example. Alternatively, said program may be a game program for achieving said game by cooperation among a plurality of user terminals 100. In addition, various types of data include data related to the game such as user information and gaming information, and instruction or notification for transmission and reception among each apparatus of the game system 1.

The storages 12, 22, and 32 are auxiliary storage devices. The storages 12, 22, and 32 are constituted by storage devices such as a flash memory or an HDD (hard disk drive). Various types of data related to the game are stored in the storages 12, 22, and 32.

The communication IF 13 controls transmission and reception of various types of data at the user terminal 100. The communication IF 23 is configured to control transmission and reception of various types of data t the server 200. The communication IF 33 controls transmission and reception of various types of data at the operation instruction device 300. The communication IFs 13, 23, and 33 controls communication via a wireless LAN (local area network), Internet communication via a wired LAN, wireless LAN, or mobile phone network, communication using short range wireless communication and the like, for example.

The input and output IF 14 is an interface for the user terminal 100 to accept an input of data, and also an interface for the user terminal 100 to output data. The input and output IF 14 may perform the input and output of the data via a USB (universal serial bus) or the like. The input and output IF 14 may include a physical button, a camera, a microphone, a speaker or the like of the user terminal 100, for example. The input and output IF 24 of the server 200 is an interface for the server 200 to accept an input of data, and also an interface for the server 200 to output data. The input and output IF 24 may include, for example, an input unit corresponding to an information input apparatus such as a mouse or a keyboard, and a display unit corresponding to an apparatus configured to display and output an image. The input and output IF 34 of the operation instruction device 300 is an interface for the operation instruction device 300 to accept an input of data, and also an interface for the operation instruction device 300 to output data. The input and output IF 34 may include, for example. a connecting portion for transmission and reception of data among an information input apparatus such as a mouse, a keyboard, a stick, a lever, an apparatus for displaying and outputting image such as a liquid crystal display, and peripheral apparatuses (the microphone 3010, the motion capture device 3020, and the controller 3030).

The touch screen 15 of the user terminal 100 is an electronic part in which the input unit 151 and the display unit 152 are combined. The touch screen 35 of the operation instruction device 300 is an electronic part in which the input unit 351 and the display unit 352 are combined. The input units 151, 351 are touch-sensitive devices, for example, and are constituted by a touch pad, for example. The display units 152, 352 are constituted by a liquid crystal display or an organic EL (electro-luminescence) display, for example.

The input units 151, 351 include a functionality of sensing the position at which a manipulation of the user (mainly, a physical contact operation such as a touch operation, a sliding operation, a swipe operation, and a tap operation) on the input surface is input, and transmitting information indicating the position as an input signal. The input units 151, 351 may only include a touch sensing unit that is not illustrated. The touch sensing unit adopting any system such as an electrostatic capacitance system or a resistive film system may be used.

Although not illustrated in the drawing, the user terminal 100 may include one or more sensors configured to identify a held posture of said user terminal 100. This sensor may be, for example, an acceleration sensor, an angular rate sensor, or the like. When the user terminal 100 includes a sensor, the processor 10 can identify the held posture of the user terminal 100 from an output of the sensor, and perform processing according to the held posture. For example, when the user terminal 100 is held in a portrait orientation, the processor 10 may perform a portrait screen display for displaying a vertically long image on the display unit 152. On the other hand, when the user terminal 100 is held in a landscape orientation, the processor 10 may perform a landscape screen display for displaying a horizontally long image on the display unit. In this manner, a configuration may be adopted where the processor 10 can switch between the portrait screen display and the landscape screen display according to the held posture of the user terminal 100.

The camera 17 includes an image sensor or the like, and is configured to generate a captured image by converting incident light that is incident from a lens into an electric signal.

The distance measuring sensor 18 is a sensor configured to measure a distance to a measurement target object. For example, the distance measuring sensor 18 includes a light source configured to emit pulse-converted light and a light-receiving element configured to receive light. The distance measuring sensor 18 measures the distance to the measurement target object based on light emission timing from the light source and light reception timing of reflected light generated when the light emitted from the light source has reached the measurement target object to be reflected. The distance measuring sensor 18 may have a light source configured to emit light having directivity.

Herein, an example will be further described in which the user terminal 100 accepts, as the input manipulation by the user, a detection result obtained by using the camera 17 and the distance measuring sensor 18 to detect the object 1010 near the user terminal 100. The camera 17 and the distance measuring sensor 18 may be provided on a side of the housing of the user terminal 100, for example. The distance measuring sensor 18 may be provided near the camera 17. For example, an infrared camera can be used as the camera 17. In this case, an illumination device configured to radiate infrared rays, a filter for shielding visible light, and the like may be provided in the camera 17. With this configuration, irrespective of whether is outdoor or indoor, a detection accuracy of an object based on the captured image of the camera 17 can be further improved.

The processor 10 may perform one or more processes, for example, among processes illustrated in the following (1) to (5) on the captured image of the camera 17. (1) By performing image recognition processing on the captured image of the camera 17, the processor 10 identifies whether the hand of the user is included in the captured image. The processor 10 may use a technique such as, for example, pattern matching as an analysis technique adopted in the image recognition processing described above. (2) In addition, the processor 10 detects a gesture of the user from a shape of the hand of the user. The processor 10 identifies the number of at least one finger of the user (the number of at least one stretched finger) from the shape of the hand of the user detected from the captured image, for example. The processor 10 further identifies the gesture performed by the user from the identified number of the fingers. For example, when the number of fingers is five, the processor 10 determines that the user has performed a gesture of "paper" as in rock, paper, and scissors. In addition, when the number of fingers is zero (no finger is detected), the processor 10 determines that the user has performed a gesture of "rock". In addition, when the number of fingers is two, the processor 10 determines that the user has performed a gesture of "scissors". (3) By performing the image recognition processing on the captured image of the camera 17, the processor 10 detects whether a state is established in which only an index finger is held up among the fingers of the user or whether the fingers of the user have made a flicking motion. (4) The processor 10 detects a distance between the object 1010 near the user terminal 100 (such as the hand of the user or the like) and the user terminal 100 based on at least any one of an image recognition result of the captured image of the camera 17, an output value of the distance measuring sensor 18, and the like. For example, the processor 10 detects whether the hand of the user is near the user terminal 100 (within a distance below a predetermined value, for example) or far from the user terminal 100 (at a distance of the predetermined value or above, for example) based on a size of the shape of the hand of the user identified from the captured image of the camera 17. Note that when the captured image is a moving image, the processor 10 may detect whether the hand of the user is approaching the user terminal 100 or moving away from the user terminal 100. (5) When it is found, based on the image recognition result of the captured image of the camera 17 or the like, that the distance between the user terminal 100 and the hand of the user changes while the hand of the user is being detected, the processor 10 recognizes that the user is waving their hand in a shooting direction of the camera 17. When an object is sometimes detected and is sometimes not detected in the distance measuring sensor 18 having more intense directivity compared with a shooting range of the camera 17, the processor 10 recognizes that the user is waving their hand in a direction orthogonal to the shooting direction of the camera.

In this manner, the processor 10 detects whether the user is squeezing their hand (corresponding to the gesture of "rock" or other gestures (for example, "paper")) by the image recognition on the captured image of the camera 17. In addition, the processor 10 detects how the user is moving this hand together with the shape of the hand of the user. In addition, the processor 10 detects whether the user is moving this hand to approach the user terminal 100 or to be away from the user terminal 100. Such a manipulation can be associated with a manipulation using a pointing device such as a mouse or a touch panel, for example. The user terminal 100 moves a pointer on the touch screen 15 according to the movement of the hand of the user, for example, to detect the gesture "rock" of the user. In this case, the user terminal 100 recognizes that the user continues a selection operation. The continuation of the selection operation corresponds, for example, to a situation where the mouse is clicked and depressed and this state is being maintained or a situation where a touch down manipulation is performed on the touch panel and thereafter the touched state is maintained. In addition, when the user further moves the hand while the gesture "rock" of the user is being detected, the user terminal 100 can recognize such a series of gestures as a manipulation corresponding to a swipe operation (or a drag manipulation). In addition, when a gesture of the user flicking the fingers is detected based on the detection result of the hand of the user by the captured image of the camera 17, the user terminal 100 may recognize the gesture as a manipulation corresponding to a click of the mouse or a tap operation on the touch panel.

[Functional Configuration of Game System 1]

Figure 2:
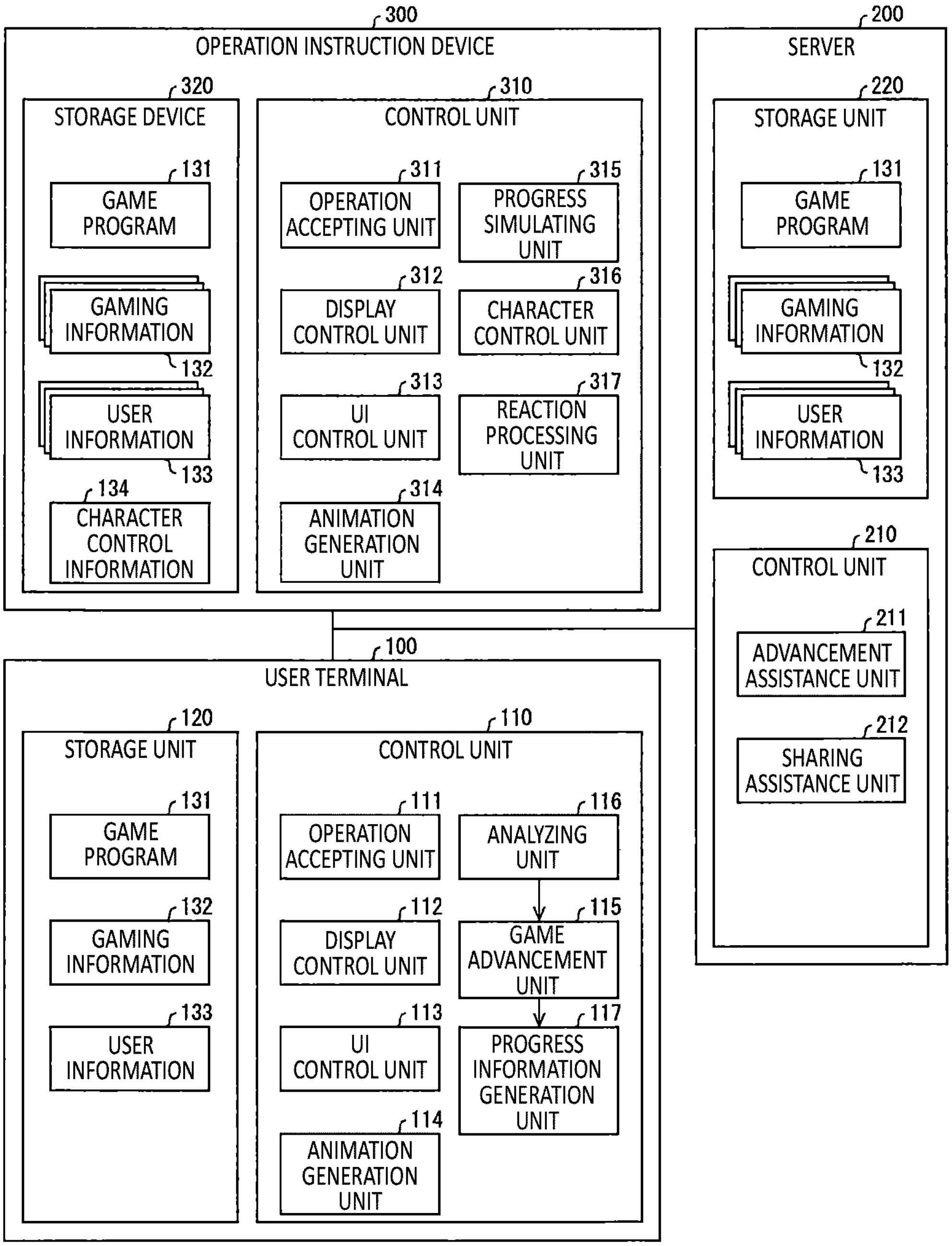
FIG. 2 is a block diagram illustrating a functional configuration of a user terminal, a server and an operation instruction device.

FIG. 2 is a block diagram illustrating a functional configuration of a user terminal 100, a server 200 and an operation instruction device 300 that are included in the game system 1. Each of the user terminal 100, the server 200, and the operation instruction device 300 may include a functional configuration required when functioning as a general computer and a functional configuration required to achieve well-known functionalities in games, which are not illustrated.

The user terminal 100 has functionality as an input apparatus for accepting input manipulation of the user and functionality as an output device for outputting an image or a voice of the game. The user terminal 100 functions as the control unit 110 and the storage unit 120 through cooperation by the processor 10, the memory 11, the storage 12, the communication IF 13, the input and output IF 14, and the like.

The server 200 has functionality for communicating with each user terminal 100 to assist the user terminal 100 to advance the game. For example, when the user terminal 100 downloads an application according to the present game for the first time, the user terminal 100 is provide with data to be stored in the user terminal 100 at the time of start the game for the first time. For example, the server 200 transmits operation instruction data for operating a character to the user terminal 100. The operation instruction data may include, in advance, motion capture data obtained by capturing a motion of an actor such as the model, may include audio data obtained by recording a voice of an actor such as the voice actor, may include manipulation history data indicating a history of input manipulation to operate the character, and may include a motion command group in which commands associated with a series of input manipulations described above are listed in time series. In a case where the present game is a multi-play game, the server 200 may have functionality for communicating with each user terminal 100 participating in the game to mediate interaction among the user terminals 100 and synchronizing control functionality. In addition, the server 200 has functionality for mediating between the user terminal 100 and the operation instruction device 300. In this manner, the operation instruction device 300 is able to supply operation instruction data to the user terminal 100 or the group of a plurality of user terminals 100 in a timely manner, without misdirecting. The server 200 functions as the control unit 210 and the storage unit 220 through cooperation by the processor 20, the memory 21, the storage 22, the communication IF 23, the input and output IF 24 and the like.

The operation instruction device 300 has functionality for generating the operation instruction data to instruct operation of the character at the user terminal 100 to supply the same to the user terminal 100. The operation instruction device 300 functions as the control unit 310 and the storage unit 320 through cooperation by the processor 30, the memory 31, the storage 32, the communication IF 33, the input and output IF 34, and the like.

The storage units 120, 220, and 320 store game program 131, gaming information 132, and user information 133. The game program 131 is a game program executed by the user terminal 100, the server 200, and the operation instruction device 300. The gaming information 132 is data referred to by the control units 110, 210, and 310 when executing the game program 131. The user information 133 is data related to the account of the user. At the storage units 220 and 320, the gaming information 132 and the user information 133 are stored for each user terminal 100. The storage unit 320 further stores character control program 134. The character control program 134 is a program executed by the operation instruction device 300, which is a program for controlling operation of the character to appear in the game based on the game program 131 described above.

[Functional Configuration of Server 200]

The control unit 210 executes the game program 131 stored in the storage unit 220 to comprehensively control the server 200. For example, the control unit 210 transmits various types of data, program and the like to the user terminal 100. The control unit 210 receives a part or all of the gaming information or the user information from the user terminal 100. In a case where the game is a multi-play game, the control unit 210 may receive a synchronizing request for multi-play from the user terminals 100, and transmit data for synchronization to the user terminals 100. In addition, the control unit 210 communicates with the user terminals 100 and the operation instruction device 300, as required, to perform transmission and reception of information.

The control unit 210 functions as an advancement assistance unit 211 and sharing assistance unit 212, according to the description in the game program 131. The control unit 210 can also function as other functional blocks that is not illustrated, to assist advancement of the game at the user terminals 100, according to the characteristics of the game to be executed.

The advancement assistance unit 211 communicates with the user terminal 100, and the user terminal 100 performs assistance for advancement of each part included in the present game. For example, when the game is advanced by the user terminal 100, the advancement assistance unit 211 provides information required for advance of said game to the user terminal 100.

The sharing assistance unit 212 communicates with a plurality of user terminals 100 to perform assistance in sharing of the decks of each other at respective user terminals 100 among the plurality of users. In addition, the sharing assistance unit 212 may have functionality for matching the user terminals 100 that are online with the operation instruction device 300. In this manner, transmission and reception of information between the user terminal 100 and the operation instruction device 300 is performed smoothly.

[Functional Configuration of the User Terminal 100]

The control unit 110 executes the game program 131 stored in the storage unit 120 to comprehensively control the user terminal 100. For example, the control unit 110 causes the game to advance in accordance with the game program 131 and a manipulation by the user. In addition, while the game advances, the control unit 110 communicates with the server 200 and the operation instruction device 300, as required, to perform transmission and reception of information.

The control unit 110 functions as an operation accepting unit 111, a display control unit 112, a user interface (hereinafter, UI), a control unit 113, an animation generation unit 114, a game advancement unit 115, an analyzing unit 116, and a progress information generation unit 117, according to the description in the game program 131. The control unit 110 can also function as functionality as other functional blocks that is not illustrated, to advance the game according to the characteristics of the game to be executed.

The operation accepting unit 111 senses and accepts an input manipulation of the user on the input unit 151. The operation accepting unit 111 determines what kind of input manipulation was performed from the effect made by the user on the console via the touch screen 15 and other input and output IFs 14, and outputs the result to each element of the control unit 110.

For example, the operation accepting unit 111 accepts an input manipulation on the input unit 151, detects the coordinate of the input position of said input manipulation, and identifies the type of said input manipulation. The operation accepting unit 111 identifies, as the type of the input manipulation, a touch operation, a sliding operation, a swipe operation, a tap operation, and the like, for example. In addition, the operation accepting unit 111 senses that contact input has been disabled from the touch screen 15 when an input that had been continuously sensed is intermitted.

The UI control unit 113 controls an UI object to be displayed on the display unit 152 to construct a UI. The UI object is a tool for the user to perform an input required for advancement of the game on the user terminal 100, or a tool for the user to obtain information output during the advancement of the game from the user terminal 100. The UI object is, for example, an icon, a button, a list, a menu screen or the like, but is not limited thereto.

The animation generation unit 114 generates an animation indicating the motion of various objects based on the control mode of the various objects. For example, the animation generation unit 114 may generate an animation or the like that portrays the character moving, moving its mouth, or changing its expression, as if it exists there.

The display control unit 112 outputs, to a display unit 152 of the touch screen 15, a game screen in which the result of processing executed by each element described above is reflected. The display control unit 112 may display a game screen including the animation generated by the animation generation unit 114 on the display unit 152. In addition, the display control unit 112 may depict the UI object described above controlled by the UI control unit 113 to be superimposed on said game screen.

The game advancement unit 115 advances the game. In the present embodiment, the game advancement unit 115 advances the present game according to the input manipulation of the user that is input via the operation accepting unit 111. During advancement of the game, the game advancement unit 115 causes one or more character to make appearance, and operates said characters. The game advancement unit 115 may operate the characters in accordance with the pre-downloaded game program 131, may operate the characters in accordance with the input manipulation of the user, or may operate the characters in accordance with the operation instruction data supplied from the operation instruction device 300.

In a case where the present game is configured to be divided into a plurality of parts, such as the first part, the second part . . . , the game advancement unit 115 advances the game in accordance with the specification for each part.

To specifically describe with an example, it is assumed that the first part is a story part in which the story in the game advances by interacting with the character. In this case, the game advancement unit 115 advances the story part as described below. Specifically, the game advancement unit 115 operates the character in accordance with a game program 131 that has also been previously downloaded, the operation instruction data (first operation instruction data) that has been similarly previously downloaded, or the like. Based on the input manipulation of the user accepted by the operation accepting unit 111, the game advancement unit 115 identifies the choice selected by the user, and causes the character to perform the operation associated with said choice. It is assumed that the second part is a live distribution part in which the character is operated based on the operation instruction data supplied from the operation instruction device 300. In this case, the game advancement unit 115 operates the character to advance the live distribution part, based on the operation instruction data from the operation instruction device 300.

The analyzing unit 116 analyzes (renders) the operation instruction data, and instructs the game advancement unit 115 to operate the character based on the analysis result. In the present embodiment, the analyzing unit 116 is triggered by reception of the operation instruction data supplied from the operation instruction device 300 via the communication IF 33 to start the rendering of said operation instruction data. The operation instruction device 300 communicates the analysis result to the game advancement unit 115, and instructs it to immediately operate the character based on the operation instruction data. That is, the game advancement unit 115 is triggered by reception of the operation instruction data to operate the character based on said operation instruction data. In this manner, the character operating in real-time can be presented to the user.

The progress information generation unit 117 generates progress information indicating the progress of the game being executed by the game advancement unit 115, and transmits the same to the server 200 or the operation instruction device 300 in time. The progress information may include, for example, information that specifies the game screen that is currently displaying the game, or may include an advancement log that indicates the progress of the game by letters, symbols or the like in time series. In the game system 1, in an embodiment where the server 200 and the operation instruction device 300 does not require the progress information, the progress information generation unit 117 may be omitted.

[Functional Configuration of the Operation Instruction Device 300]

The control unit 310 executes the character control program 134 stored on the storage unit 320 to comprehensively control the operation instruction device 300. For example, the control unit 310 generates the operation instruction data in accordance with the character control program 134 and the manipulation of the operator, and supplies the same to the user terminal 100. The control unit 310 may further execute the game program 131, as required. In addition, the control unit 310 communicates with the server 200 and the user terminal 100 that is executing the present game to perform transmission and reception of information.

The control unit 310 functions as an operation accepting unit 311, a display control unit 312, a UI control unit 313, an animation generation unit 314, a progress simulating unit 315, and a character control unit 316, according to the description in the character control program 134. The control unit 310 can also function as other functional blocks that are not illustrated, to control the character that appears in said game, according to the characteristics of the game to be executed at the game system 1.

The operation accepting unit 311 senses and accepts an input manipulation of the operator on the input unit 351. The operation accepting unit 311 determines what kind of input manipulation was performed from the effect made by the operator on the console via the touch screen 35 and other input and output IFs 34, and outputs the result to each element of the control unit 310. The details of functionality of the operation accepting unit 311 are almost similar to those of the operation accepting unit 111 in the user terminal 100.

The UI control unit 313 controls the UI object to be displayed on the display unit 352.

The animation generation unit 314 generates an animation indicating the motion of various object based on the control mode of the various object. For example, the animation generation unit 314 may generate an animation or the like that replicates the game screen that is actually displayed on the user terminal 100 with which it communicates.

The display control unit 312 outputs, to a display unit 352 of the touch screen 35, a game screen in which the result of the processing executed by each element described above is reflected. The details of the functionality the display control unit 312 are almost similar to those of the display control unit 112 in the user terminal 100.

The progress simulating unit 315 grasps the progress of the game at the user terminal 100 based on the progress information received from the user terminal 100 indicating the progress of the game. The progress simulating unit 315 then replicates the behavior of said user terminal 100 at the operation instruction device 300 in a simulating manner, to present the progress of the user terminal 100 to the operator.

For example, the progress simulating unit 315 may display, on the display unit 352 its own apparatus, replication of the game screen being displayed on the user terminal 100. In addition, on the user terminal 100, the progress simulating unit 315 may display, on the display unit 352, the progress of the game as the advancement log described above.

A part of the functionality of the progress simulating unit 315 may be achieved by executing the game program 131 by the control unit 310. For example, the progress simulating unit 315 first grasps the progress of the game of the user terminal 100 based on the progress information. The progress simulating unit 315 may then replicate, completely or in a simplified manner, on the display unit 352 of its own apparatus, the game screen that is currently being displayed based on the game program 131 at the user terminal 100. Alternatively, the progress simulating unit 315 may grasp the progress of the game at the current time point, predict the game advancement after the current time period based on the game program 131, and output the prediction result on the display unit 352.

The character control unit 316 controls the behavior of the character to be displayed on the user terminal 100. Specifically, the operation instruction data for operating the character is generated and supplied to the user terminal 100. For example, the character control unit 316 generates the operation instruction data for instructing the character that is the controlled object to speak, based on the audio data input by the operator (a voice actor or the like) via the microphone 3010. The operation instruction data thus generated at least includes the audio data described above. In addition, for example, operation instruction data is generated for instructing the character that is the controlled object to make movements based on the motion capture data input by the operator (a model or the like) via the motion capture device 3020. In this manner, the generated operation instruction data at least includes the motion capture data described above. In addition, for example, the operation instruction data is generated for instructing the character that is the controlled object to operate based on a history of the input manipulations input by the operator via an input mechanism such as the controller 3030 or a manipulation unit such as the input unit 351, that is, the manipulation history data. The operation instruction data thus generated at least includes the manipulation history data described above. The manipulation history data is, for example, information in which the manipulation log indicating which button of the controller 3030 was pressed at what timing by the operator when the display unit was displaying which screen is organized in time series. The display unit here is a display unit that works together with the controller 3030, and may be the display unit 352 of the touch screen 35, or may be another display unit connected via the input and output IF 34. Alternatively, the character control units 316 identify a command for instructing an operate of the character, associated with the input manipulation input by the operator via the input mechanism or manipulation unit described above. The character control unit 316 may then organize said commands in order or the input to generate a motion command group indicating a series of operations of the character, and generate the operation instruction data for instructing operation of the character in accordance with said motion command group. The operation instruction data thus generated at least includes the motion command group described above.

A reaction processing unit 317 accepts a feedback for the reaction of the user from the user terminal 100, and outputs the same to the operator of the operation instruction device 300. In the present embodiment, for example, the user can create a comment for said character while the user terminal 100 operates the character is in accordance with the operation instruction data described above. The reaction processing unit 317 accepts the comment data of sad comment and outputs the same. The reaction processing unit 317 may display the text data corresponding to the comment of the user on the display unit 352, or may output audio data corresponding to the comment of the user from a speaker that is not illustrated.

Note that, the functionality of the user terminal 100, the server 200, and the operation instruction device 300 shown in FIG. 2 are merely examples. Each of the user terminal 100, the server 200, and the operation instruction device 300 may include at least a part of the functionality of another device. Further, yet another device other than the user terminal 100, the server 200, and the operation instruction device 300 can be a component of the game system 1, and said another device may be caused to execute a part of the processing at the game system 1. That is, the computer that executes the game program in the present embodiment may be any of the user terminal 100, the server 200, the operation instruction device 300, and another device other than the above, and may be achieved by a combination of a plurality of these devices.

Note that, in the present embodiment, the progress simulating unit 315 may be omitted. In addition, in the present embodiment, the control unit 310 can function as the reaction processing unit 317 according to the description in the character control program 134.

[Game Configuration]

Figure 3:
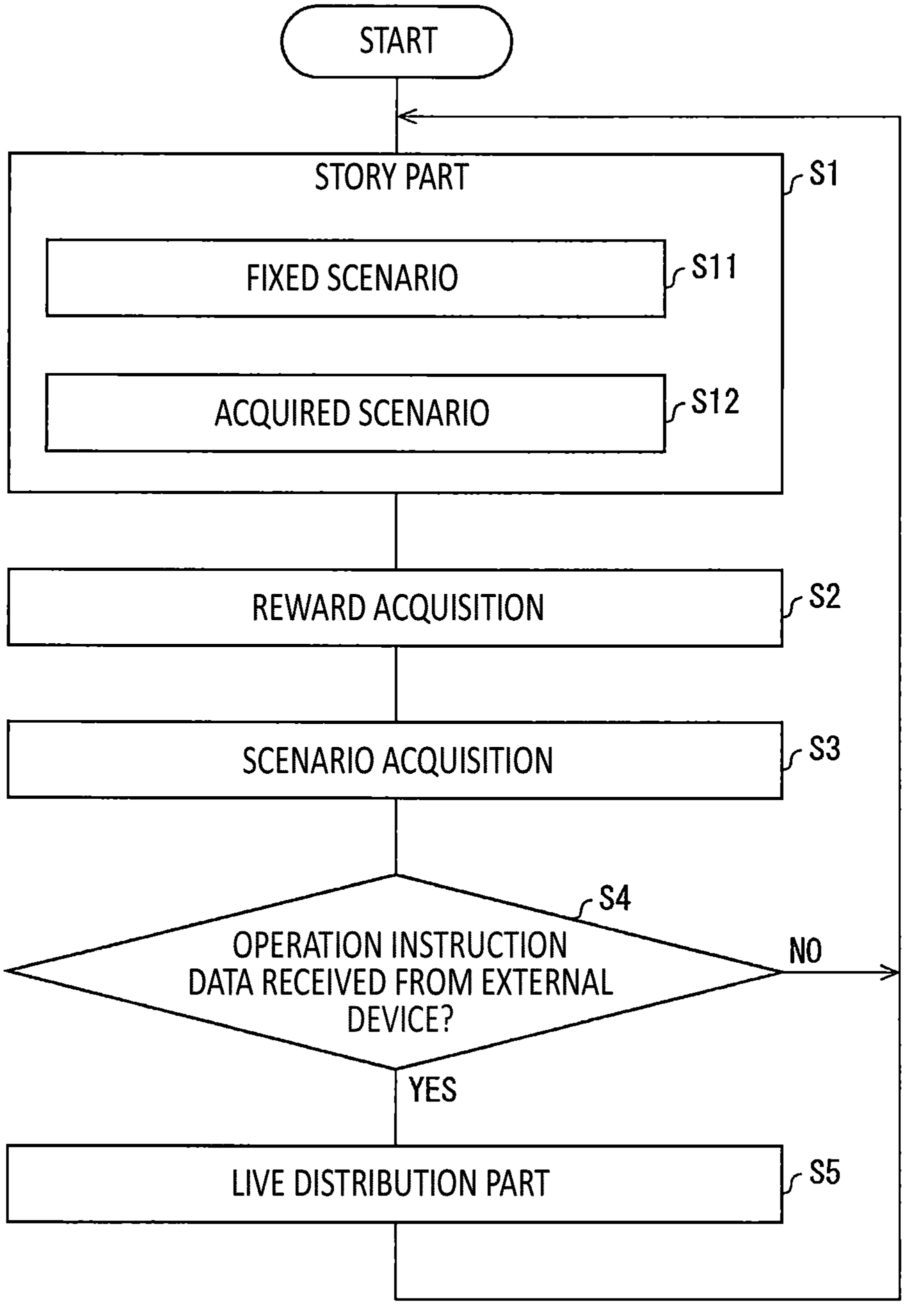
FIG. 3 is a flowchart illustrating an example of a basic game advancement of a game executed based on a method according to the present embodiment.

FIG. 3 is a flowchart illustrating an example of a basic game advancement of the present game. The present game is separated into two game play parts, for example. As an example, the first part is a story part and the second part is a live distribution part. The present game may also include an acquisition part for the user to acquire game media, which is digital data that can be used in the game in exchange with valuable data owned by the user. In the present embodiment, the playing order or each part is not particularly limited. FIG. 3 illustrates a case where the user terminal 100 executes the game in the order of the story part, the acquisition part, and the live distribution part.

At step S1, the game advancement unit 115 executes the story part. The story part includes a fixed scenario S11*a* and an acquired scenario 12*a* (described below). The story part includes, for example, a scene in which a main character manipulated by the user and the character interacts. In the present embodiment, as an example, a "scenario" that is assembled as digital data corresponds to one chapter of a story regarding the character, and is supplied from the server 200 to be stored temporarily in the storage unit 120. In the story part, the game advancement unit 115 reads one scenario that is stored in the storage unit 120, and advances the one scenario until it comes to an ending according to the input manipulation of the user. The scenario includes a choice to be selected by the user, a response pattern of the character corresponding to said choice, or the like, and different endings may be met for one scenario depending on which of the choices the user selects. Specifically, the game advancement unit 115 presents a plurality of choices corresponding to actions from the main character to the character to be selectable by the user, and advances the scenario according to the choice selected by said user.

At step S2, when the user plays the scenario up to the end, the game advancement unit 115 may allow said user to acquire a reward according to the ending. The reward is provided to the user as game media, which is digital data that can be used in the game, for example. The game media may be an item such as clothing that can be worn by the character, for example. Here, "allowing the user to acquire a reward" may be, as an example, to transition the status of game media as a reward that is managed in association with the user from unusable to usable. Alternatively, it may be to store the game media in at least any of the memories (the memory 11, the memory 21, the memory 31) included in the game system 1 in association with the user identification information, the user terminal ID, or the like.

At step S3, the game advancement unit 115 executes the acquisition part. In the acquisition part, the game media to be acquired by the user may be a new scenario that is different from the scenario provided to the user terminal 100 at the time of the first time download. Hereinafter, the former scenario is referred to as a fixed scenario, and the latter scenario is referred to as an acquired scenario. When it is not necessary to distinguish between the two, they are simply referred to as a scenario.

In the acquisition part, the game advancement unit 115 allows the user to own an acquired scenario that is different from the fixed scenario that the user already owns, in exchange with consumption of valuable data of the user, for example. The scenario to be acquired by the user may be decided by the game advancement unit 115 or the advancement assistance unit 211 of the server 200 in accordance with predetermined regulations. More specifically, the game advancement unit 115 or the advancement assistance unit 211 may perform a lottery to decide a scenario to be acquired by the user randomly from a plurality of acquired scenarios. The acquisition part may be executed at any timing before or after the story part and the live distribution part.

At step S4, the game advancement unit 115 determines whether the operation instruction data has been received from an external device via the network. The game advancement unit 115 may return from NO at step S4 to step S1, for example, to execute the story part, until the operation instruction data is received from the external device. Alternatively, the game advancement unit 115 may execute the acquisition part at step S3. On the other hand, when the operation instruction data is received from the external device, the game advancement unit 115 proceeds from YES at step S4 to step S5.

At step S5, the game advancement unit 115 executes the live distribution part (second part). Specifically, the game advancement unit 115 advances the live distribution part by operating the character in accordance with the operation instruction data received at step S4. At step S1, in the scenario, the user merely interacted with the character showing targeted reaction, via the UI. However, in the live distribution part, the user can interact in a freely interactive manner with the character that is operated in real-time based on the operation instruction data transmitted from the external device. More specifically, the analyzing unit 116 receives, from the operation instruction device 300, the operation instruction data including the audio data and motion data generated according to the content of the input manipulation of the user. The game advancement unit 115 then makes the character speak, based on the audio data included in the received operation instruction data, as well as adds motion to the character based on the motion data described above. In this manner, the user can be presented with a reaction of the character to the input manipulation of the user described above.

[Processing Overview]

In the present embodiment, the user terminal 100 is configured to execute the following steps to improve amusement of the game, based on the game program 131. Specifically, the user terminal 100 executes a step of operating the NPC based on the operation instruction data that specifies the operation of the NPC that is not manipulated by neither the user or other users, which is the first operation instruction data prestored in the memory 11, and advancing the first part according to the input manipulation of the user that is input via the manipulation unit (the input and output IF 14, the touch screen 15, the camera 17, the distance measuring sensor 18), and a step of advancing the second part by operating the NPC based on the second operation instruction data received from the NPC control device (operation instruction device 300).

According to the configuration described above, in the first part, the user terminal 100 operates the NPC based on the first operation instruction data that has been previously downloaded. In addition to this, the user terminal 100 receives the second operation instruction data from the operation instruction device 300, and operates the NPC based on the second operation instruction data in the second part. Since the NPC can be operated based on the second operation instruction data received from the operation instruction device 300, the operation of the NPC becomes unconventional and the expression thereof expands significantly. Therefore, through the interaction with the NPC in the game play, the user can feel a sense of reality as if said NPC exists in the real world. As a result, a sense of immersion of the game world is enhanced, which leads to an effect of improving the amusement of said game.

<Data Structure>

[Operation Instruction Data]

FIG. 4 illustrates an example of a data structure of the operation instruction data to be processed at the game system 1 according to the present embodiment. As an example, the operation instruction data is configured to include each of the items "destination", a "creation source", which are meta-information, and each of the items a "character ID", a "voice", a "motion", which are the contents of the data.

Destination specifying information is stored in the item "destination". The destination specifying information is information indicating which device said operation instruction data was intended to be transmitted to. The destination specifying information may be, for example, an address unique to the user terminal 100, or may be identification information of a group that the user terminal 100 belongs to. It may be a symbol (for example, "ALL" or the like) indicating that all the user terminals 100 meeting a certain condition is set as the destination.

Creation source information is stored in the item "creation source". The creation source information is information indicating which device created said operation instruction data. The creation source information is, for example, information related to the user (hereinafter, user-related information) that allows identification of a particular user, such as a user ID, a user terminal ID, a unique address of the user terminal, or the like. The creation source information may be an ID or an address that designates the server 200 or the operation instruction device 300, or said item may be empty when the creation source is the server 200 or the operation instruction device 300, or said item itself may not be provided in the operation instruction data.

A character ID for uniquely identifying the character that appears in the present game is stored in the item "character ID". The character ID stored here indicates which of the character said operation instruction data is intended to instruct operation of.

Audio data for the character to speak is stored in the item "voice". Motion data for specifying a motion of the character is stored in the item "motion". The motion data may be motion capture data acquired by the operation instruction device 300 via the motion capture device 3020, as an example. The motion capture data may be data obtained by tracking the motion of the entire body of the actor, may be data obtained by tracking the facial expression and movement of the mouth of the actor, or may be the both of the above. The motion data may be a motion command group for instructing a series of motion of the character identified by a manipulation input by the operator of the operation instruction device 300 via the controller 3030, as another example. For example, in a case where the commands of "raise right hand", "raise left hand", "walk", and "run" are assigned to a button A, a button B, a button C, a button D of the controller 3030, respectively, it is assumed that the operator pressed the button A, the button B, the button C, the button D in order. In this case, the motion command group in which each of the commands "raise right hand", "raise left hand", "walk", "run" are organized in the order described above is store in the item "motion" as the motion data. Note that, in the present embodiment, the audio data and the motion data are included in the operation instruction data in synchronous state.

By receiving such operation instruction data, the game advancement unit 115 can operate the character to make appearance in the game exactly as intended by the creation source of said operation instruction data. Specifically, in a case where the operation instruction data includes the audio data, the game advancement unit 115 makes the character speak based on said audio data. In addition, in a case where the operation instruction data includes the motion data, the game advancement unit 115 moves the character based on the motion data, that is, generates an animation of said character such that it makes movements based on the motion data.

[Gaming Information]

FIG. 5 illustrates an example of a data structure of the gaming information 132 to be processed at the game system 1 according to the present embodiment. The items provided in the gaming information 132 are decided as appropriate according to the genre, the characteristics, the contents or the like of the game, and the exemplary items do not limit the scope of the present invention. As an example, the gaming information 132 is configured to include each of the items "play history", "item", "relationship", "familiarity", and "distribution history". Each of these items is referred to as appropriate when the game advancement unit 115 advances the game.

Play history of the user is stored in the item "play history". The play history is information indicating whether the user's play has been accomplished for each scenario stored in the storage unit 120. For example, the play history includes a list of fixed scenarios downloaded at the time of first time play, and a list of acquired scenarios acquired later at the acquisition part. In each of the lists, a status such as "played", "not played", "playable", "unplayable" is associated for each scenario.

An item list as the game media owned by the user is stored in the item "item". In the present game, the item is clothing to be worn by the character, as an example. The user can make the character wear an item obtained by playing the scenario, to customize the appearance of the character.

A relationship, which is one of the status of the character, is stored in the item "relationship". Relationship is a parameter indicating the degree of friendship between the main character, which is practically the other self of the user, and the character. For example, the game advancement unit 115 may advance the game more advantageously for the user for higher degree of relationship. For example, the game advancement unit 115 may increase or decrease the degree of relationship according to the quality of the play result of the scenario. As an example, the game advancement unit 115 increases the relationship for a better selection of the choices by the user and for a better content of the ending met in the scenario. On the other hand, the game advancement unit 115 may decrease the relationship when the user faced a bad ending in the scenario.

Familiarity, which is one of the status of the character, is stored in the item "familiarity". The familiarity is a parameter indicating the high degree of popularity, the degree of recognition and the like of the character as the moving image distributor. Supporting moving image distribution activity of the character to increases the familiarity of said character and to achieve said character's dream becomes one of the purposes of the present game. As an example, a special scenario may be provided as a reward to a user who was able to achieve a certain degree of familiarity or higher.

A list of moving images that was live streamed in the past by the character in the live distribution part, or a so-called back number, is stored in the item "distribution history". In the live distribution part, moving images that are streamed through PUSH distribution in real-time can only be viewed at that time. On the other hand, moving images that were distributed in the past are recorded in the server 200 or the operation instruction device 300, and can be streamed through PULL distribution according to a request from the user terminal 100. In the present embodiment, as an example, the user may be allowed to download the back number by paying for it.

<Screen Example of the Story Part>

Figure 6:
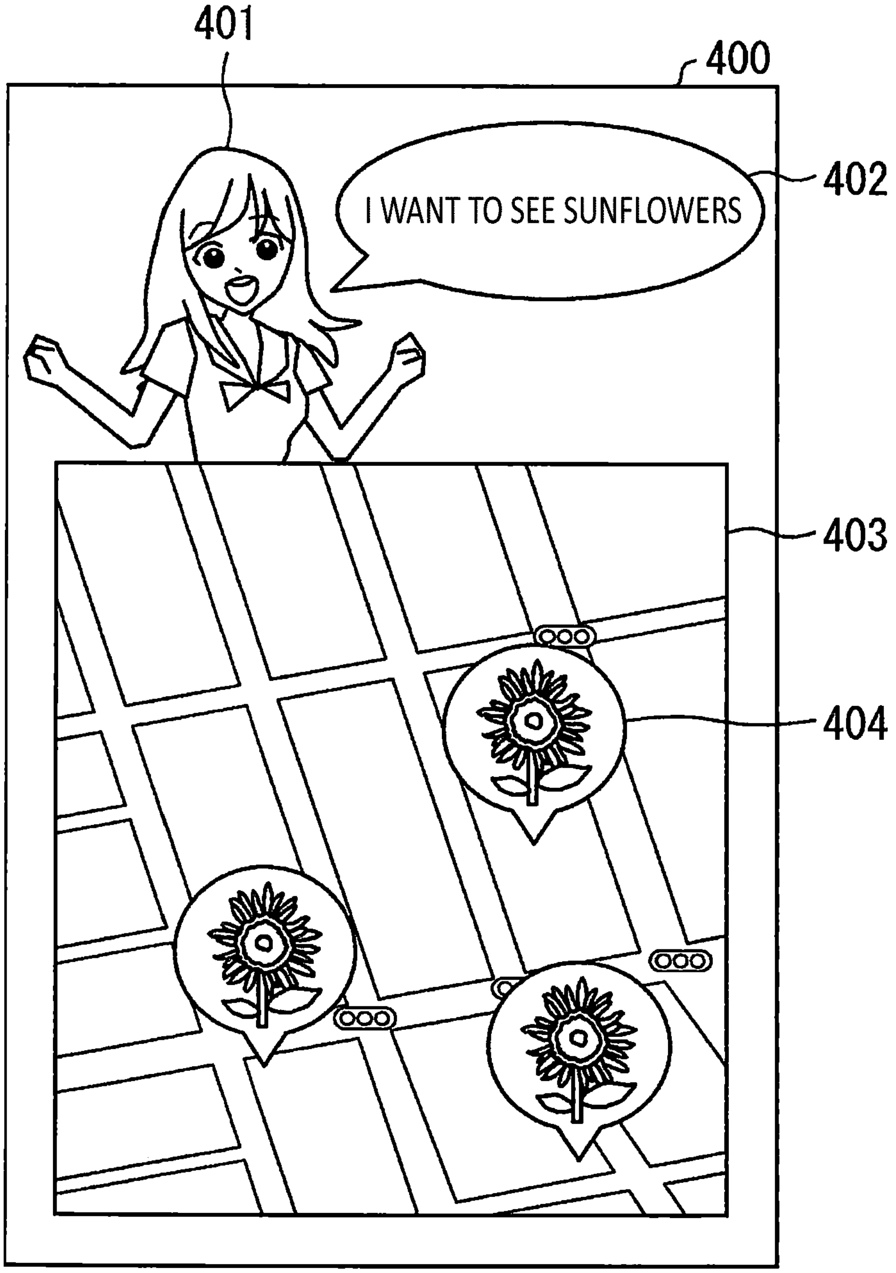
FIG. 6 illustrates an example of a quest presentation screen that is displayed on a display unit of the user terminal.

FIG. 6 illustrates an example of a quest presentation screen 400 displayed on the display unit 152 of the user terminal 100. The game advancement unit 115 presents a quest to the user in accordance with the game program 131 during advancement of a scenario in the story part. Specifically, the game advancement unit 115 makes the character speak to the main character about requests corresponding to the quest through the interaction between the main character and the character. At this time, for example, the game advancement unit 115 may display the quest presentation screen 400 shown in FIG. 6 on the display unit 152.

The method for presenting the character to perform a series of operation for "making the character speak about requests" is not particularly limited. For example, the game advancement unit 115 may display a still image of the character to speak based on text data corresponding to the request that is prestored in the storage unit 120. Specifically, the game advancement unit 115 displays, on the display unit 152, the quest presentation screen 400 including the character 401, a balloon 402 indicating that it is a speech by the character 401, and the text data of the request arranged in the balloon 402. Alternatively, the game advancement unit 115 may display an animation of the character to speak based on the operation instruction data corresponding to a scene where the request is spoken that is prestored in the storage unit 120. Specifically, the game advancement unit 115 moves the character 401 in accordance with the motion capture data included in the operation instruction data, and at the same time, outputs audio data included in said operation instruction data as a voice from a speaker that is not illustrated included in the user terminal 100.

In the present embodiment, as an example, the game advancement unit 115 may achieve the quest by a location-based game utilizing position registration information of the user terminal 100. The game advancement unit 115 acquires current location information (for example, address information, latitude/longitude information, or the like) of the user terminal 100 from the position registration system that is not illustrated included in the user terminal 100. Based on the acquired current location information, a map 403 around the place where the user terminal 100 is located is then generated, and is arranged on the quest presentation screen 400. Note that, the map data from which the map 403 is generated may be prestored in the storage unit 120 of the user terminal 100, or may be acquired via a network from another service provider device that provides map data.

Subsequently, the game advancement unit 115 decides a location (address, latitude/longitude or the like) where an object (hereinafter, a target object) to enable the request to be solved can be acquired, displays a target icon 404 to be superimposed at a location on the map corresponding to the decided location In this manner, the user can understand that they can acquire the target object and clear the quest by moving to the location of the target icon 404 on the map 403 while holding the user terminal 100. The location of the target object may be decided by the game advancement unit 115 randomly, or may be predetermined according to the content or the scenario, the quest of the target object.

When the user brings the user terminal 100 to an actual location corresponding to to the location of the target icon 404, the game advancement unit 115 determines that the main character has reached the target object and allows the user to acquire the target object. In this manner, the game advancement unit 115 determines that the quest has been cleared.

Figure 7:
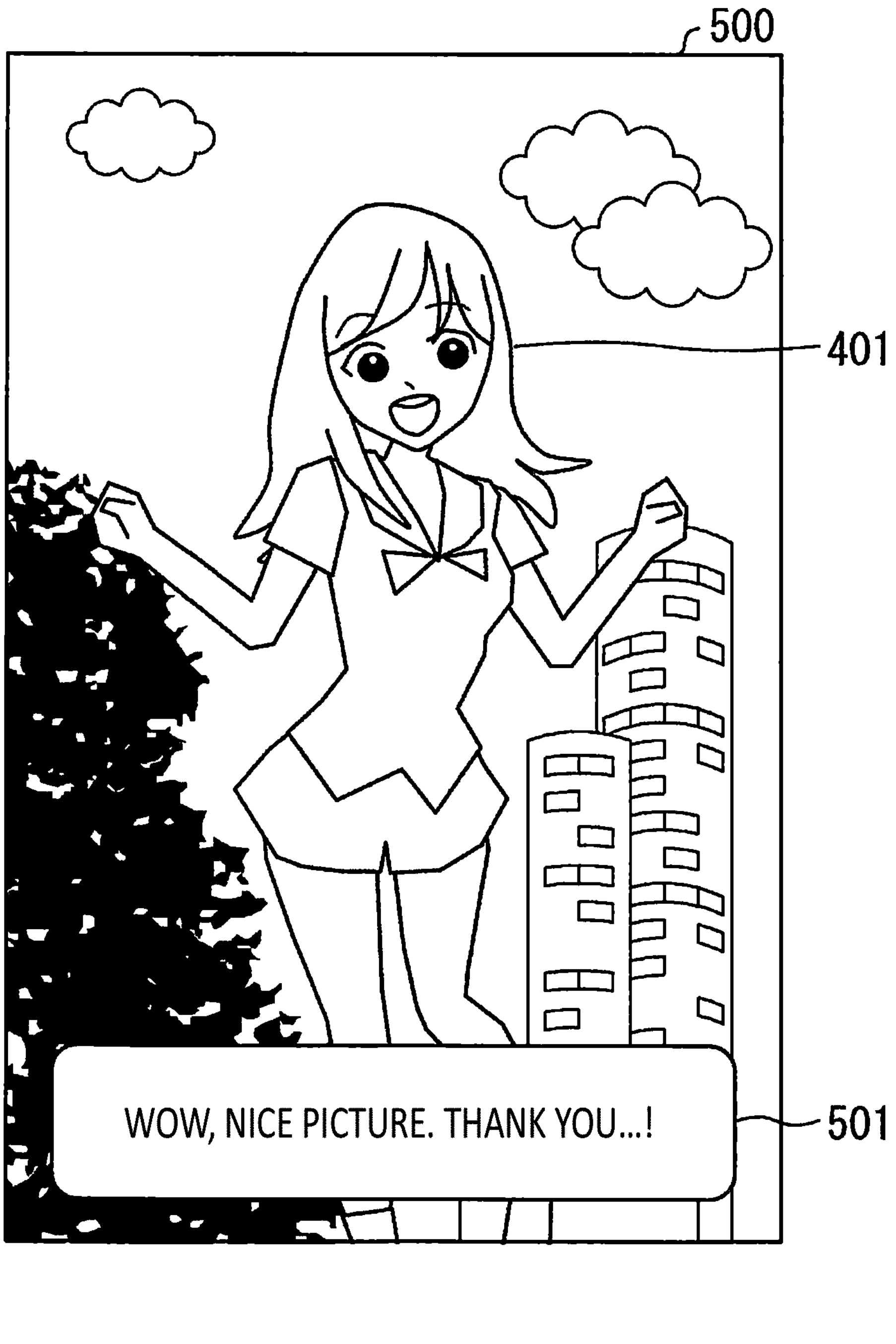
FIG. 7 illustrates an example of a quest clear screen that is displayed on the display unit of the user terminal.

In the present embodiment, when a quest is cleared, the game advancement unit 115 may generate a quest clear screen 500, and display the same on the display unit 152. FIG. 7 illustrates an example of a quest clear screen 500 displayed on the display unit 152 of the user terminal 100. As an example, the quest clear screen 500 includes the character 401. For example, the game advancement unit 115 performs an operation in which the character 401 is caused to "thank the main character for solving the request". The game advancement unit 115 may cause the character 401 to perform this operation based on prestored operation instruction data. Alternatively, the game advancement unit 115 may replicate a scene in which the character 401 is expressing its gratitude by arranging a still image of the character 401 and text data 501 corresponding to the speech content on the quest clear screen 500.

In the present embodiment, the game advancement unit 115 may release a new fixed scenario related to the character 401, who is the requester, as a reward for clearing the quest, and transition it to a state in which it can be played by the user. Specifically, the game advancement unit 115 reads the play history shown in FIG. 5, and updates the status of the predetermined fixed scenario from "unplayable" to "playable".

Further, the game advancement unit 115 may increase the relationship of the main character with the character based on the quest being cleared. The game advancement unit 115 may be configured such that the relationship is increased for better play content (required time, movement distance, acquired number, degree of the character's joy, degree of rarity of the acquired target object, or the like) of the quest.

Interaction with the character proceeds and the scenario advances by the user clearing one or more quests or selecting a choice. When the scenario meets one ending, the user has accomplished playing the scenario.

The game advancement unit 115 may allow the user to acquire an item as a reward for playing the scenario. The item is clothing to be worn by the character 401, for example. The game advancement unit 115 decides the item to be acquired by the user based on a predetermined regulation. For example, the game advancement unit 115 may grant an item that is previously associated with the scenario being played to the user, or may grant an item that is decided according to the play content of the scenario (required time to clear the quest, acquired relationship, whether a good choice was selected, or the like) to the user. Alternatively, the item to be granted to the user may be decided randomly from a plurality of candidates.

Figure 8:
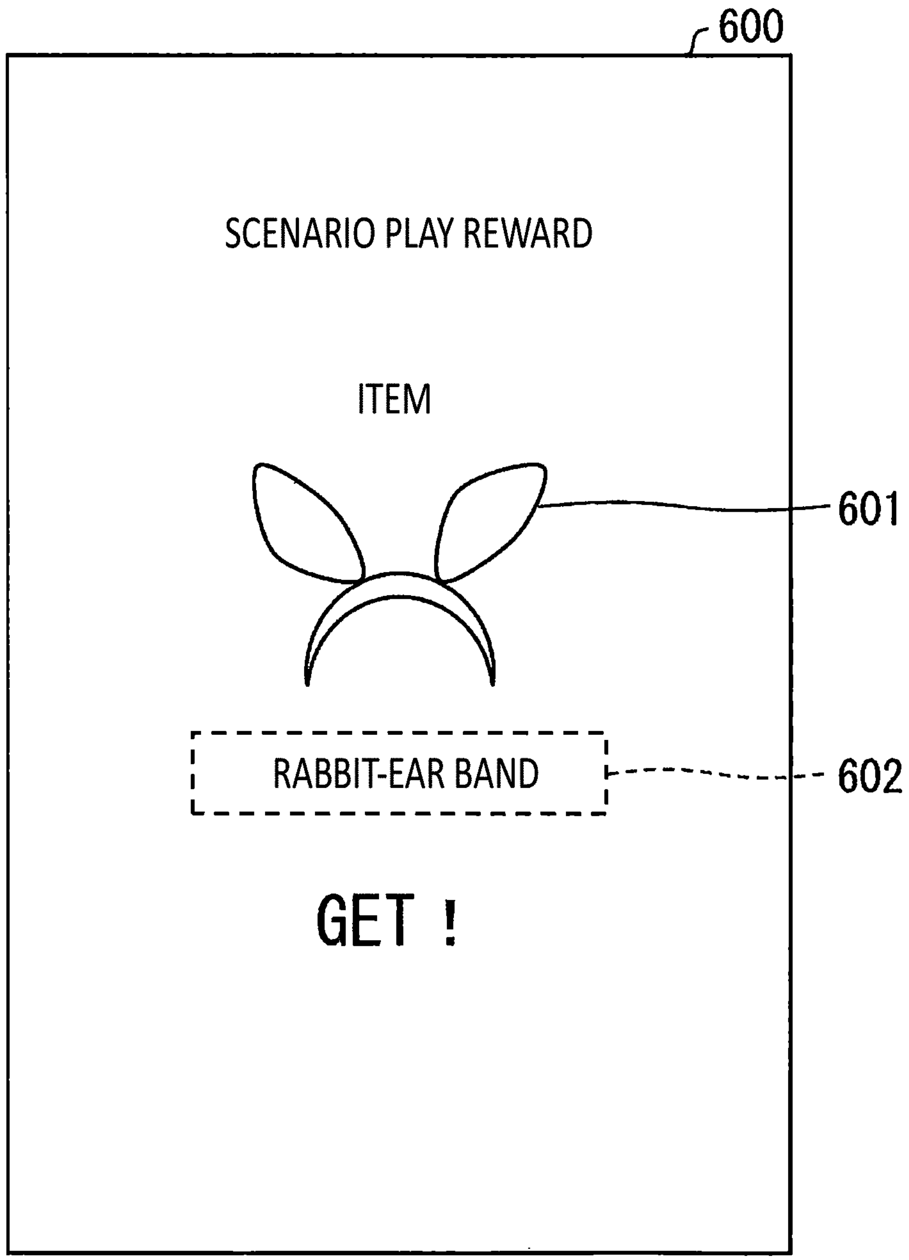
FIG. 8 illustrates an example of a reward screen that is displayed on the display unit of the user terminal.

In the present embodiment, the game advancement unit 115 may generate a reward screen 600 to notify the user of the acquired item, and display the same on the display unit 152. FIG. 8 illustrates an example of the reward screen 600 displayed on the display unit 152 of the user terminal 100. As an example, the reward screen 600 may include an icon 601 of the acquire item, and the name 602 of said item. In this manner, the user can confirm the item that they can acquire. In addition, the game advancement unit 115 adds the acquired item described above to an item list stored in the item "item" shown in FIG. 5.

<Screen Example of the Live Distribution Part>

When the operation instruction data is received from an external device such as the operation instruction device 300, for example, the game advancement unit 115 operates the character based on said operation instruction data in the live distribution part. For example, a moving image playing screen 800 including the character that is operated based on the operation instruction data in the live distribution part is generated and displayed on the display unit 152.

Figure 9:
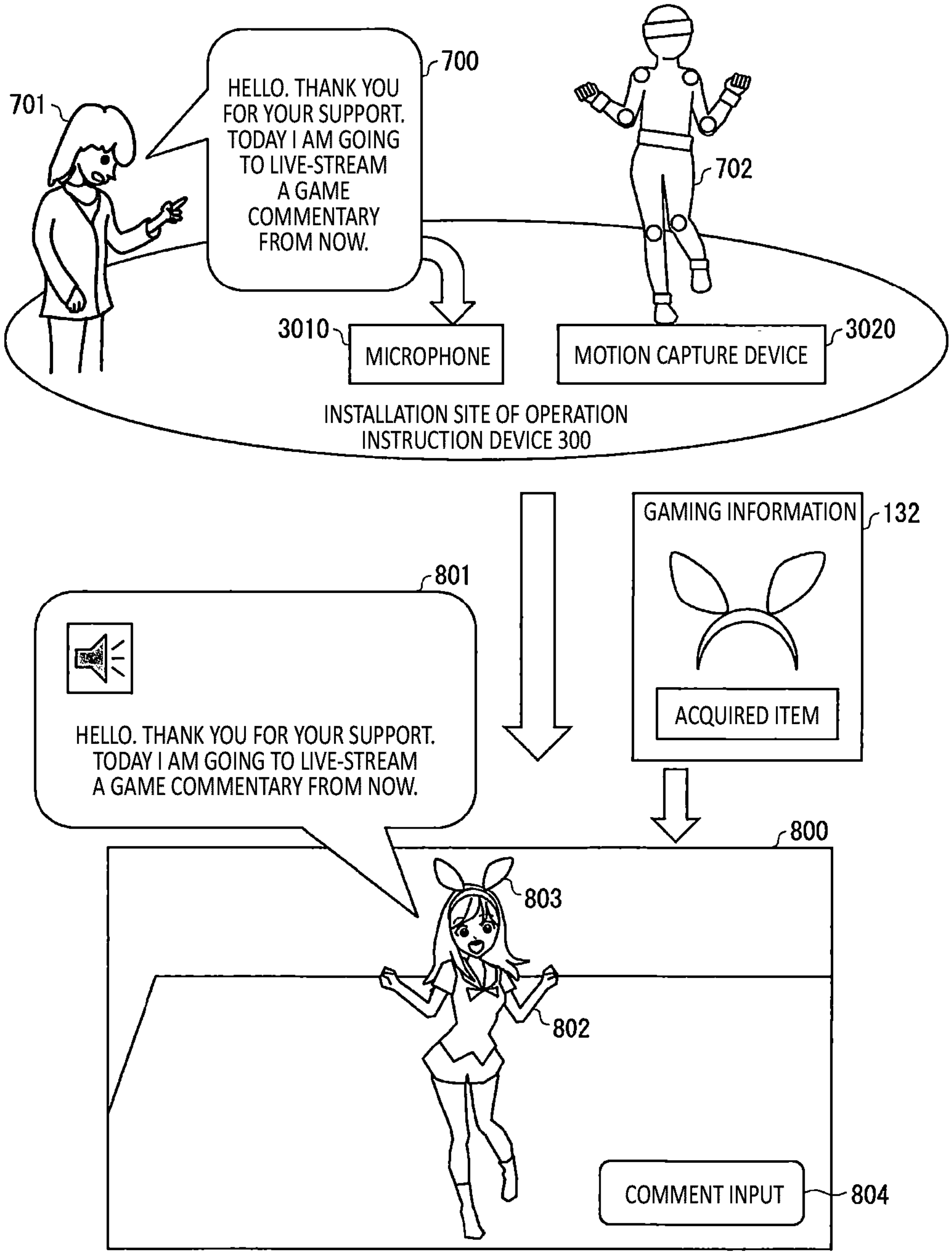
FIG. 9 illustrates an example of a moving image playing screen that is displayed on the display unit of the user terminal.

FIG. 9 illustrates an example of the moving image playing screen 800 displayed on the display unit 152 of the user terminal 100. The moving image playing screen 800 at least includes a character (the character 802 in the illustrated example) who was the interaction counterpart in the story part, as an example.

In the present embodiment, the game advancement unit 115 reflects the motion indicated by the motion capture data included in the operation instruction data supplied from an external device (hereinafter, the operation instruction device 300) to the motion of the character 802. The motion capture data is the motion of the model 702 acquired via the motion capture device 3020 at the installation site of the operation instruction device 300. Therefore, the motion of the model 702 is directly reflected to the motion of the character 802 displayed on the display unit 152.

In the present embodiment, the game advancement unit 115 outputs the audio data 801 included in the operation instruction data supplied from the operation instruction device 300, as the voice exerted by the character 802, in synchronism with the motion of the character 802. The audio data is the voice 700 of a voice actor 701 obtained via the microphone 3010 at the installation site of the operation instruction device 300. Therefore, the audio data 801 corresponding to the voice 700 exerted by the voice actor 701 is directly output from the speaker of the user terminal 100.

According to the configuration described above, at the installation site of the operation instruction device 300, the voice and motion of the actually existing voice actor 701 and model 702 are directly reflect to the voice and motion of the character 802. Seeing the character 802 performing such operation, the user can feel a sense of reality as if the character 802 exists in the real world, and can immerse in the game world.

Further, in the present embodiment, the game advancement unit 115 may decide the play result of the story part based on the input manipulation of the user in the story part (first part). The game advancement unit 115 may then display, on the display unit 152, the character to be operated based on the operation instruction data in the live distribution part (second part), in a display mode according to said play result.

As an example, if an item that can be worn by the character described above is acquired in the previously played story part, the game advancement unit 115 preferably synthesizes an object of that item onto the object of the character 802. According to the configuration described above, the item acquired by the user by playing the story part can be reflected to the clothing of the character 802 being operated in the live distribution part. For example, as shown in FIG. 8, an item as clothing (for example, a rabbit ear band) has been acquired by playing the scenario in the story part. In this case, the game advancement unit 115 reads information on said clothing from the gaming information 132 shown in FIG. 5, and synthesizes the object of said item (the clothing 803 in the illustrated example) onto the character 802.

In this manner, the user can further feel a sense of attachment to the character 802 and further enjoy the live distribution part. Further, willingness of the user to upgrade the clothing of the character 802 can grow, and as a result, it may allow enhancement of motivation to play the story part.

Further, in the present embodiment, the game advancement unit 115 may be able to input a comment addressed to the character 802 in response to the operation of the character 802. As an example, the game advancement unit 115 arranges a comment input button 804 on the moving image playing screen 800. The user touches the comment input button 804 to call for a UI for inputting a comment, and manipulates said UI to input a comment addressed to the character 802. Said UI may be for the user to select a desired comment from several comments that is previously prepared. Said UI may be for the user to organize letters to input a comment. Said UI may be for the user to input a comment with their voice.

<Process Flow>

Figure 10:
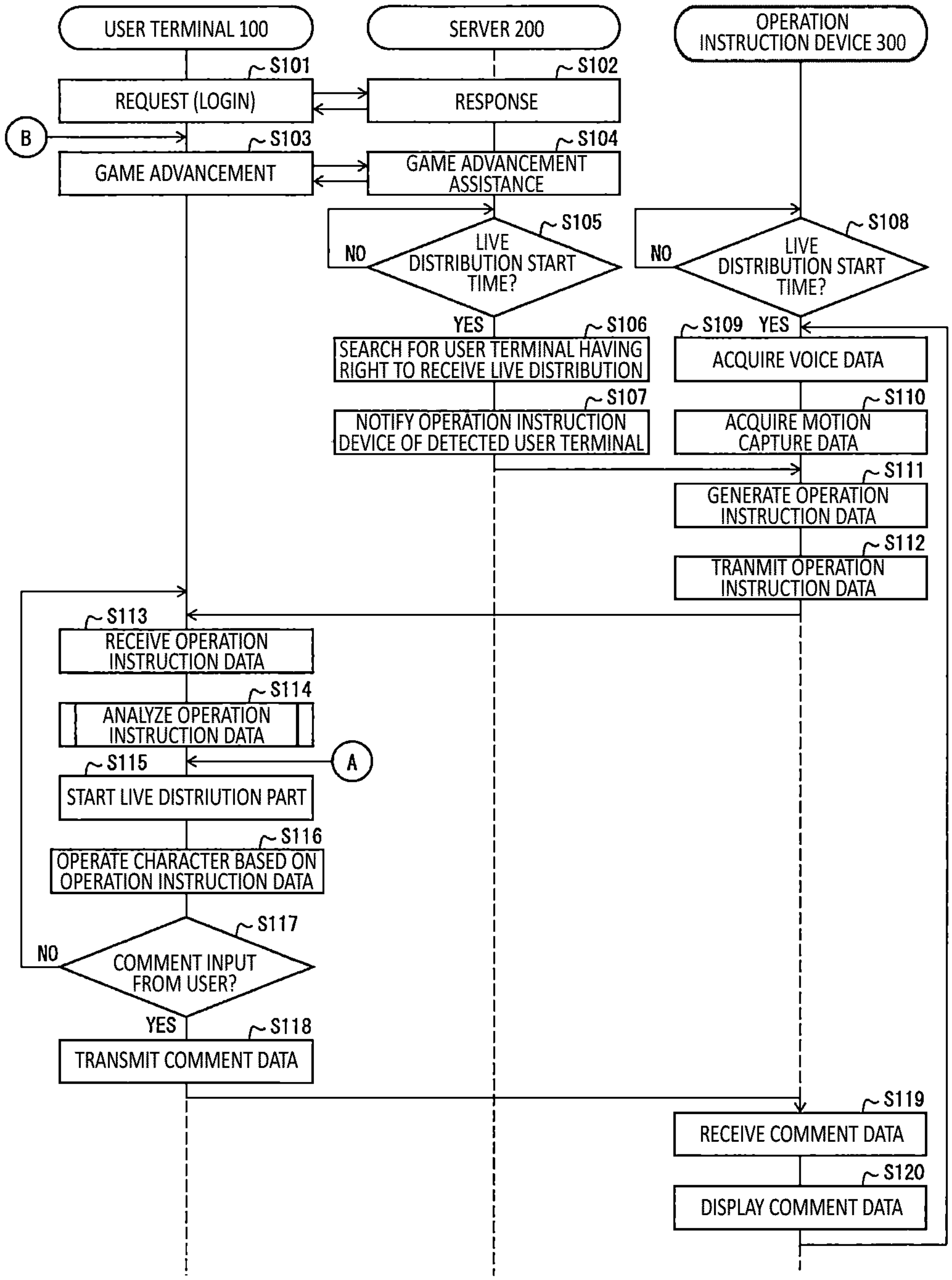
FIG. 10 is a flowchart illustrating a process flow that is executed in the game system.

FIG. 10 is a flowchart illustrating the process flow that is executed by each apparatus that constitutes the game system 1.

At step S101, when an input manipulation for starting the game from the user is accepted, the game advancement unit 115 of the user terminal 100 accesses the server 200 and performs a log in request.

At step S102, the advancement assistance unit 211 of the server 200 confirms that the status of the user terminal 100 is online, and responds that the log in is accepted.

At step S103, the game advancement unit 115 advances the game according to the input manipulation of the user while communicating with the server 200, as required. The game advancement unit 115 may advance the story part, or may advance the acquisition part to acquire a new scenario.

At step S104, the advancement assistance unit 211 assists game advancement at the user terminal 100 by providing required information to the user terminal 100, as required, or the like.

At step S105, when the live distribution time is reached, the sharing assistance unit 212 of the server 200 proceeds from YES at step S105 to step S106. The live distribution time is predetermined by a game master, for example, and is managed at the server 200 and the operation instruction device 300. In addition, the live distribution time may be previously notified to the user terminal 100, or may be kept secret until the live distribution time is actually reached. In the case of the former, live distribution can be stably supplied to the user, where as in the case of the latter, live distribution can be supplied to the user with specially added value as a surprise distribution.

At step S106, the sharing assistance unit 212 searches for one or more user terminals 100 having the right to receive the live distribution. Requirements for receiving the live distribution may be set by the game master as appropriate, but at least included as the requirements are that an application of the present game has been installed, being online at the time of the live distribution, and the like. In the present embodiment, as an example, the user terminal 100 that is online at the time of the live distribution, that is, having the application for the present game activated is searched for as the user terminal 100 having the right to receive the live distribution. Alternatively, the sharing assistance unit 212 may further add, as the requirement, that it is a user terminal 100 held by a user who has paid a consideration for receiving the live distribution. Alternatively, the sharing assistance unit 212 may search for a particular user terminal 100 that has made a reservation in advance to receive the live distribution at the live distribution time described above, as the user terminal 100 having the right to receive the live distribution.

At step S107, the sharing assistance unit 212 notifies the operation instruction device 300 of the detected one or more user terminals 100. For example, the sharing assistance unit 212 may notify the operation instruction device 300 of the terminal ID of the user terminal 100, the user ID of the user who owns the user terminal 100, the address of the user terminal 100, or the like.

On the other hand, at step S108, when the live distribution time is reached, the character control unit 316 of the operation instruction device 300 proceeds from YES at step S108 to steps S109 to S110. At steps S109 to S110, any of the steps may be performed first.

At step S109, the character control unit 316 acquires the voice input by an actor such as a voice actor via the microphone 3010 as audio data.

At step S110, the character control unit 316 acquires the motion input by a actor such as a model via the motion capture device 3020 as motion capture data.

At step S111, the character control unit 316 generates the operation instruction data (second operation instruction data). Specifically, the character control unit 316 identifies the character to distribute the moving image at the live distribution start time described above, and stores the character ID of said character in the item "character ID" in the operation instruction data. At what time to distribute a moving image of which character may be scheduled in advance by the game master, and registered to the operation instruction device 300. Alternatively, the operator of the operation instruction device 300 may specify in advance, to the operation instruction device 300, which character's operation instruction data is to be created. The character control unit 316 stores the audio data acquired at step S109 in the item "voice" in the operation instruction data. The character control unit 316 stores the motion capture data acquired at step S110 in the item "motion" in the operation instruction data. The character control unit 316 associates the audio data with the motion capture data, such that the audio data and the motion capture data are synchronized. So that the one or more user terminals 100 notified by the server 200 at step S107 become the destination, the character control unit 316 stores group identification information of a group of these user terminals 100 or an address of one user terminal 100 in the item "destination" in the operation instruction data as the destination specifying information.

At step S112, the character control unit 316 transmits, via the communication IF 33, the operation instruction data generated as described above to each user terminal 100 specified as the destination. The character control unit 316 desirably renders the audio data and motion capture data obtained from the actor uttering a voice or moving into operation instruction data immediately after acquiring them, and distributes the data to each user terminal 100 in real-time.

At step S113, the analyzing unit 116 of the user terminal 100 receives the operation instruction data described above via the communication IF 13. For example, the analyzing unit 116 may receive, from the operation instruction device 300 or the server 200, the operation instruction data at a time that has been announced beforehand that a live distribution will be performed.

At step S114, the analyzing unit 116 is triggered by the reception to analyze the received operation instruction data.

At step S115, if the live distribution part is not executed when the operation instruction data described above is received, the game advancement unit 115 starts said live distribution part. At this time, if a different part is being executed, the game advancement unit 115 suspends advancing said part and starts the live distribution part. Here, the game advancement unit 115 desirably outputs, on the display unit 152, a message that the part being executed will be temporarily suspended because the live distribution has started, and saves the progress of said part in the storage unit 120. Note that, if the live distribution part is already being executed at the time when the operation instruction data described above is received, the game advancement unit 115 may omit step S115. In this case, the game advancement unit 115 may output a message that the distribution of the operation instruction data has started (that is, a moving image in which the character is virtually performing the live distribution) on the display unit 152.

At step S116, the game advancement unit 115 advances the live distribution part by operating the character based on the moving image instruction data analyzed by the analyzing unit 116. Specifically, the game advancement unit 115 displays a moving image playing screen 800 or the like shown in FIG. 9 on the display unit 152. The game advancement unit 115 reflects, almost at the same time as the actor such as the voice actor 701 and the model 702 utters a voice or moves at the installation site of the operation instruction device 300, such voice and motion to the speech and motion of the character 802 in the moving image playing screen 800 in real-time. The analyzing unit 116 and the game advancement unit 115 continues the render and playing of the moving image in real-time for the duration during which the operation instruction data is continuously received from the operation instruction device 300. Specifically, while no input manipulation is accepted from the user an the operation instruction data is received, the game advancement unit 115 returns from NO at step S117 to step S113, and repeats each of the later steps.

At step S117, when the operation accepting unit 111 accepts the input manipulation of the user while the character is operated based on the operation instruction data, the game advancement unit 115 proceeds from YES at step S117 to step S118. For example, the operation accepting unit 111 accepts an input manipulation on the comment input button 804 in the moving image playing screen 800.

At step S118, the game advancement unit 115 transmits the comment data generated according to the input manipulation described above to the operation instruction device 300. Specifically, the game advancement unit 115 may transmit the comment ID of the selected comment as the comment data. Alternatively, the game advancement unit 115 may transmit the text data of a sentence input by the user as the comment data. Alternatively, the game advancement unit 115 may transmit the audio data of a voice input by the user as the comment data. Alternatively, the game advancement unit 115 may recognition the voice input by the user, and convert it into text data to be transmitted as the comment data.

At step S119, the reaction processing unit 317 of the operation instruction device 300 receives, via the communication IF 33, the comment data transmitted from the user terminal 100.

At step S120, the reaction processing unit 317 outputs the received comment data to the operation instruction device 300. For example, the reaction processing unit 317 displays the text data included in the comment data on the display unit 352. In this manner, the operator can receive a feedback indicating how the user reacted against the character that they moved. The operator can then decide further operation of the character according to this feedback. That is, the operation instruction device 300 returns to step S109, continues to acquire the audio data and the motion capture data, and continues to provide the operation instruction data to the user terminal 100. After the content of the input manipulation at the local terminal is received by the operation instruction device 300, the user terminal 100 receives the operation instruction data transmitted from said operation instruction device 300. Specifically, the user terminal 100 receives the operation instruction data including the audio data corresponding to the speech content of the character and motion capture data corresponding to the motion of the character or the like. The user terminal 100 then continuously operates the character based on said operation instruction data. As a result, the user is allowed to experience an interactive interaction in real-time with the character. Note that, instead of the motion capture data, a motion command group in which one or more commands for instructing the operation of the character are organized in the order which the operator of the operation instruction device 300 has instructed for may be received by the user terminal 100.

<Variation 1>

In variation 1 of embodiment 1, the character for performing live distribution of the moving image in the live distribution part may not be an NPC in another part. That is, the present invention can also be applied to a game in which the PC that is operated based on the user's manipulation in another part performs live distribution of the moving image as an NPC in the live distribution part.

In variation 1, the user terminal 100 is configured to execute the following steps to improve amusement of the game, based on the game program 131. Specifically, the user terminal 100 executes a step of advancing the first part by operating the character according to the input manipulation of the user that is input to the computer (user terminal 100) via the manipulation unit (the input and output IF 14, the touch screen 15, the camera 17, the distance measuring sensor 18), and a step of advancing the second part by operating the character based on operation instruction data specifying the operation of the character that is received from the NPC control device (operation instruction device 300). Here, the operation instruction data includes at least any one of the audio data and the motion capture data. In the step of advancing the second part, the user terminal 100 transmits the content of the input manipulation of the user to the NPC control device, receives the operation instruction data that is decided at the NPC control device based on the content of the input manipulation, and is triggered by the reception of the operation instruction data to operate the character.

<Variation 2>

Figure 11:
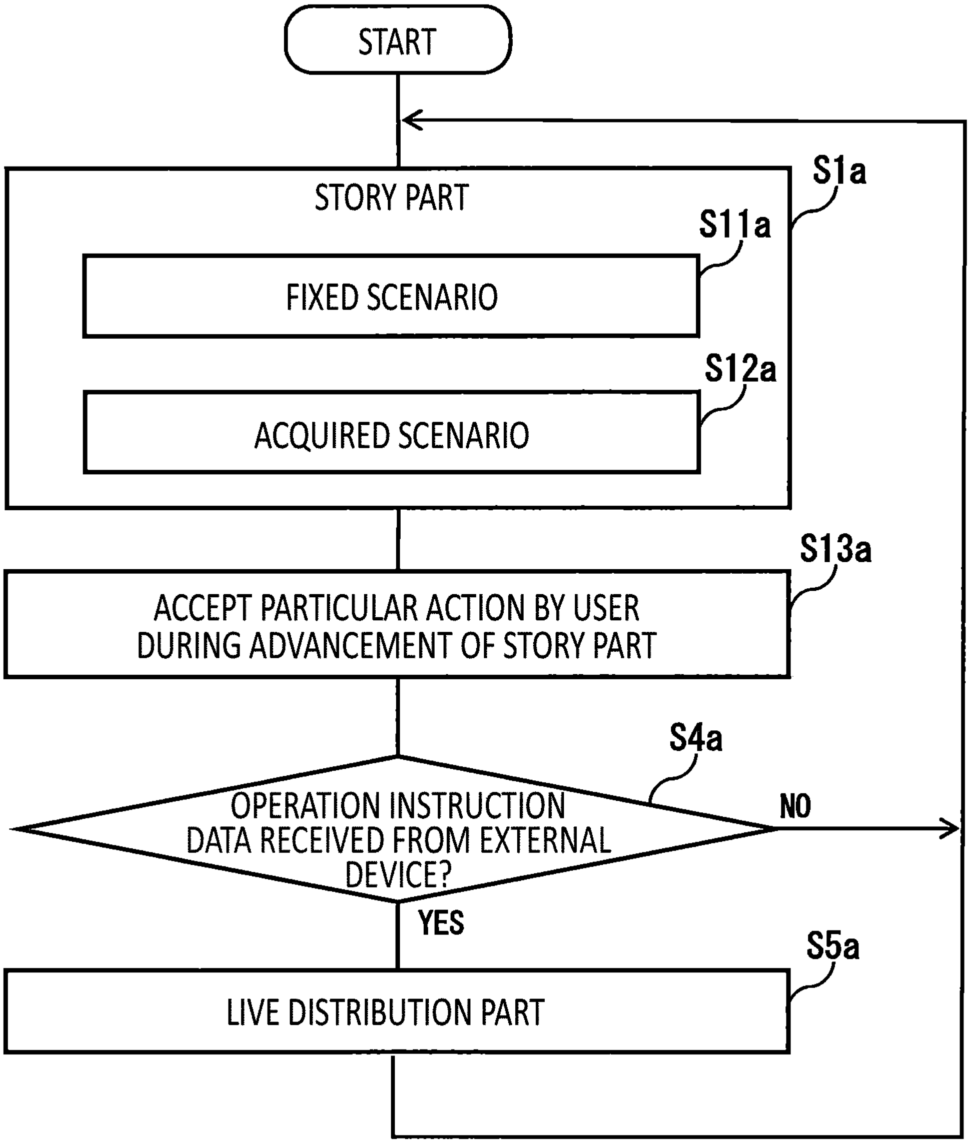
FIG. 11 is a flowchart illustrating an example of a basic game advancement for a game that is executed based on the method according to the present embodiment.

In the description of embodiment 1, a case where the user terminal 100 executes the game in the order of the story part, the acquisition part, and the live distribution part was illustrated, related to FIG. 3 described above. In contrast, in variation 2 of embodiment 1, the according to the result of whether a particular action has been performed by the user terminal 100 during advancement of the story part, the game may be advanced such that is automatically switched to the live distribution part. FIG. 11 is a flowchart illustrating a basic game advancement of a game to be executed based on the game program according to variation 2 of embodiment.

Step S1*a* is similar to step S1 in FIG. 3. That is, the game advancement unit 115 executes the story part (first part). The story part includes a fixed scenario S11*a* and an acquired scenario 12*a*. As described above, the story part includes, for example, a scene in which a main character manipulated by the user and the character interacts. In the present embodiment, as an example, a "scenario" that is assembled as digital data corresponds to one chapter of a story regarding the character, and is supplied from the server 200 to be stored temporarily in the storage unit 120. In the story part, the game advancement unit 115 reads one scenario that is stored in the storage unit 120, and advances the one scenario until it comes to an ending according to the input manipulation of the user. The scenario includes a choice to be selected by the user, a response pattern of the character corresponding to said choice, or the like, and different endings may be met for one scenario depending on which of the choices the user selects. Specifically, the game advancement unit 115 presents a plurality of choices corresponding to actions from the main character to the character to be selectable by the user, and advances the scenario according to the choice selected by said user. Note that, the character may be the NPC described above, and here, is not a target for direct manipulation by any of the users who are the game player.

During advancement of the story part at step S1*a*, at step S13*a*, the game advancement unit 115 accepts a particular action by the user. According to this, the game advancement unit 115 proceeds to step S4*a*, and the operation to switch from the story part to the live distribution part is performed. Note that, as long as no particular action by the user is accepted at step S13*a*, the game advancement unit 115 preferably continues to execute the story part at step S1*a* continuously.

Here, the result of the particular action by the user in the story part includes, as an example, the location of the user terminal 100 acquired by the position registration system described above included in the user terminal 100 becoming the predetermined location. More specifically, as described with respect to FIG. 6, a quest is achieved by a location-based game utilizing position registration information of the user terminal 100, and the user move to a location decided by the game advancement unit 115 holding the user terminal 100. As a result, when the current location information of the user terminal 100 matches said decided location, instead of or in addition to allowing the user to acquire the target object (FIG. 8), the advancement of the game may be automatically switched to the live distribution part.

In another example, the result of a particular action by the user in the story part include a predetermined scenario associated with the story part being concluded. More specifically, in the story part, interaction with the character proceeds and the scenario advances by the user clearing one or more quests or selecting a choice. When the scenario meets one ending, the user has accomplished playing the scenario. As a result, the game may be automatically switched from the story part to the live distribution part.

Returning to FIG. 11, step S4*a* is similar to step S4 in FIG. 3. That is, the game advancement unit 115 determines whether the operation instruction data has been received from an external device (the server 200 or the operation instruction device 300) via the network. The game advancement unit 115 may return from NO at step S4*a* to step S1*a*, for example, to continue to execute the story part, until the operation instruction data is received from the external device. On the other hand, when the operation instruction data is received from the external device, the game advancement unit 115 proceeds from YES at step S4*a* to step S5*a*.

Step S5*a* is similar to step S5 in FIG. 3. That is, the game advancement unit 115 executes the live distribution part (second part). Specifically, the game advancement unit 115 advances the live distribution part by operating the character in accordance with the operation instruction data received at step S4*a*. At step S1*a*, in the scenario, the user merely interacted with the character showing targeted reaction, via the UI. However, in the live distribution part, the user can interact in a freely interactive manner with the character that is operated in real-time based on the operation instruction data transmitted from the external device. More specifically, the analyzing unit 116 receives, from the operation instruction device 300, and analyzes the operation instruction data including the audio data and motion data being input by the operator (including the voice actor and the model) associated with the NPC, according to the content of the input manipulation of the user. The game advancement unit 115 then makes the character speak, based on the audio data included in the received operation instruction data, as well as adds motion to the character based on the motion data described above. In this manner, the user and the operator can cooperate by synchronizing operations in real-time and in an interactive manner. That is, the user can be presented with a reaction of the character to the input manipulation of the user described above.

In variation 2, and also in the process flow described for FIG. 10 described above, for example, at step S105, instead of or in addition to the server 200 determining whether it is the live distribution time, the server 200 preferably determines whether the user has accepted a particular action. That is, when a determination condition is met, the server 200 and the operation instruction device 300 provides live distribution in the live distribution part to the user terminal 100. Conversely, when the determination condition is not met, the advancement of the game is control such that the user terminal 100 does not proceed to the live distribution part.

When the determination condition is met, at the user terminal 100, the NPC is operated based on the operation instruction data and advancement of the live distribution part can be executed. Specifically, when the live distribution has already started at steps S108 to S110 at the operation direction terminal 300, the user terminal 100 may be enabled to receive the live distribution at real-time from the middle. Instead, when the determination condition is met, this can be triggered the live distribution to be started, and the user terminal 100 may be enabled to receive the live distribution that has ended from the beginning. Note that, the particular action by the user which is the determination condition is predetermined by the game master, for example, and is managed at the server 200 and the operation instruction device 300.

According to variation 2, in the first part, the user terminal 100 operates the NPC based on the first operation instruction data that has been previously downloaded. Switching from the first part to the second part is then performed according to the result of the particular action by the user in the first part. The user terminal 100 receives the second operation instruction data from the operation instruction device 300, and operates the NPC based on the second operation instruction data in the second part. Since the NPC can be operated based on the second operation instruction data received from the operation instruction device 300, the operation of the NPC becomes unconventional and the expression thereof expands significantly. Therefore, through the interaction with the NPC in the game play, the user can feel a sense of reality as if said NPC exists in the real world. As a result, a sense of immersion of the game world is enhanced, which leads to an effect of improving the amusement of said game. In addition, since the user needs to perform the particular action in the first part in order to transition to the second part, the gaming element can be further enhanced.

Embodiment 2

<Game Overview>

The game (hereinafter, the present game) executed by the game system 1 according to embodiment 2 is a life simulation game including an element of a dating simulation game, as an example, similar to embodiment 1. In the present embodiment, the present game at least includes a live distribution part. The present game may be constituted by a single live distribution part, or may be constituted by a plurality of parts. In addition, in the live distribution part, the character whose operation is controlled by the operation instruction device 300 may be a PC or an NPC. For example, even a character that operates as an NPC in the live distribution part may operate in accordance with an input manipulation of the user as a PC in another part. Alternatively, the character may operate in accordance with the input manipulation of the user as a PC in the live distribution part during a period where the operation instruction data is not live streamed from the operation instruction device 300. Once the live distribution has started, said character may then be switched to an NPC, and be operated in accordance with the operation instruction data supplied from the operation instruction device 300.

<Processing Overview>

In the present embodiment, the user terminal 100 is configured to execute the following steps to improve amusement of the game, based on the game program 131. Specifically, the user terminal 100 executes a step of operate a character according to an input manipulation of a user that is input to a user terminal 100 (computer) via a manipulation unit such as an input unit 151, for example, and a step of receiving operation instruction data specifying an operation of the character that is transmitted by multicast from the server 200 or an operation instruction device 300 (character control device), and a step of operating the character based on the received operation instruction data.

Further, the step of operating the character is preferably started triggered by reception, in the step of receiving, of the operation instruction data transmitted by multicast.

Alternatively, in the present embodiment, the user terminal 100 may be configured to execute the following steps to improve amusement of the game, based on the game program 131. Specifically, the user terminal 100 executes a step of operate a character according to an input manipulation of a user that is input to a user terminal 100 via a manipulation unit, and a step of receiving operation instruction data specifying an operation of the character that is transmitted from the server 200 or an operation instruction device 300 to the user terminal 100, where a user terminal 100 of another user is not specified as the creation source of said operation instruction data, and a step of operating the character based on the received operation instruction data. Note that, the operation instruction data being "transmitted to the user terminal 100" means that, for example, the operation instruction data is transmitted by unicast. For example, the user terminal 100 can determine that the operation instruction data has been transmitted to its local terminal, that is, by unicast, when an address unique to its local terminal is included in the destination specifying information.

Further, the step of operating the character is preferably start triggered by reception, in the step of receiving, operation instruction data transmitted by unicast, where no identification information of the user or the user terminal is associated with the operation instruction data.

<Functional Configuration of Game System 1>

In the user terminal 100 according to the present embodiment, the analyzing unit 116 further analyzes meta-information of the operation instruction data. Meta-information is information that defines the characteristics of the operation instruction data, apart from the content of the operation instruction data. The meta-information is, for example, destination specifying information, creation source information, and the like. Specifically, the analyzing unit 116 determines where said operation instruction data is transmitted by multicast or transmitted by unicast, based on the destination specifying information of the transmitted operation instruction data. Multicast transmission means that the server 200 or the operation instruction device 300 transmits information of the same content to a predetermined group including the local terminal. For example, the operation instruction data for which "ALL" is set as the destination specifying information is simultaneously sent to all user terminals having the application for the present game activated. Unicast transmission means that the server 200 or the operation instruction device 300 transmits information to a local terminal. The destination specifying information is stored in the item "destination" of the operation instruction data shown in FIG. 4, for example.

The operation instruction data transmitted by multicast is considered to be created by a game master, instead of a particular user. Specifically, the operation instruction data described above may be created by a device that belongs to a provider (operating body) that provides the service of the present game in the game system 1. For example, since the server 200 or the operation instruction device 300 grasps information about all users and user terminals, it is possible to create the operation instruction data, and to transmit the same to user terminals having the application activated by multicast. Therefore, the user terminal 100 can determine that the operation instruction data transmitted by multicast has been created by the game master.

In the present embodiment, the analyzing unit 116 may have the functionality described below, as an example. Specifically, the analyzing unit 116 renders the operation instruction data transmitted by multicast. The analyzing unit 116 then instructs the game advancement unit 115 to operate the character based on the rendering result. More preferably, the analyzing unit 116 is triggered by reception of the operation instruction data transmitted by multicast to render said operation instruction data in real-time. Subsequently, the analyzing unit 116 instructs the game advancement unit 115 to operate the character based on the rendering result.

In another embodiment, the analyzing unit 116 may have the functionality described below, instead of or in addition to the functionality described above. Specifically, the analyzing unit 116 renders operation instruction data transmitted by unicast, where information related to a particular user, such as the user ID or the user terminal ID, is not associated with said operation instruction data, for example. The analyzing unit 116 then instructs the game advancement unit 115 to operate the character based on the rendering result. More preferably, when the analyzing unit 116 determines that the operation instruction data is transmitted by unicast, the analyzing unit 116 determines whether said operation instruction data has been created by a particular user terminal, based on the creation source information of said operation instruction data. For example, the analyzing unit 116 determines, for operation instruction data having information related to a particular user associated thereto as the creation source information, that it is created by a particular user terminal. Operation instruction data for which a value of the creation source information is empty, and operation instruction data that does not have creation source information associated thereto to begin with, the analyzing unit 116 determines that it is not created by a particular user terminal. It is considered that operation instruction data that has not been created by a particular user terminal has been created by the game master.

The analyzing unit 116 is triggered by reception of the operation instruction data that is transmitted by unicast and does not have information related to a particular user associated thereto as the creation source information to render said operation instruction data in real-time. Subsequently, the analyzing unit 116 instructs the game advancement unit 115 to operate the character based on the rendering result.

In this manner, based on the operation instruction data distributed from the game master, the user terminal 100 can reflect the intention of said game master to operate the character in real-time. Therefore, the character can provide a sense of reality as if said character really exists there.

<Process Flow>

Figure 12:
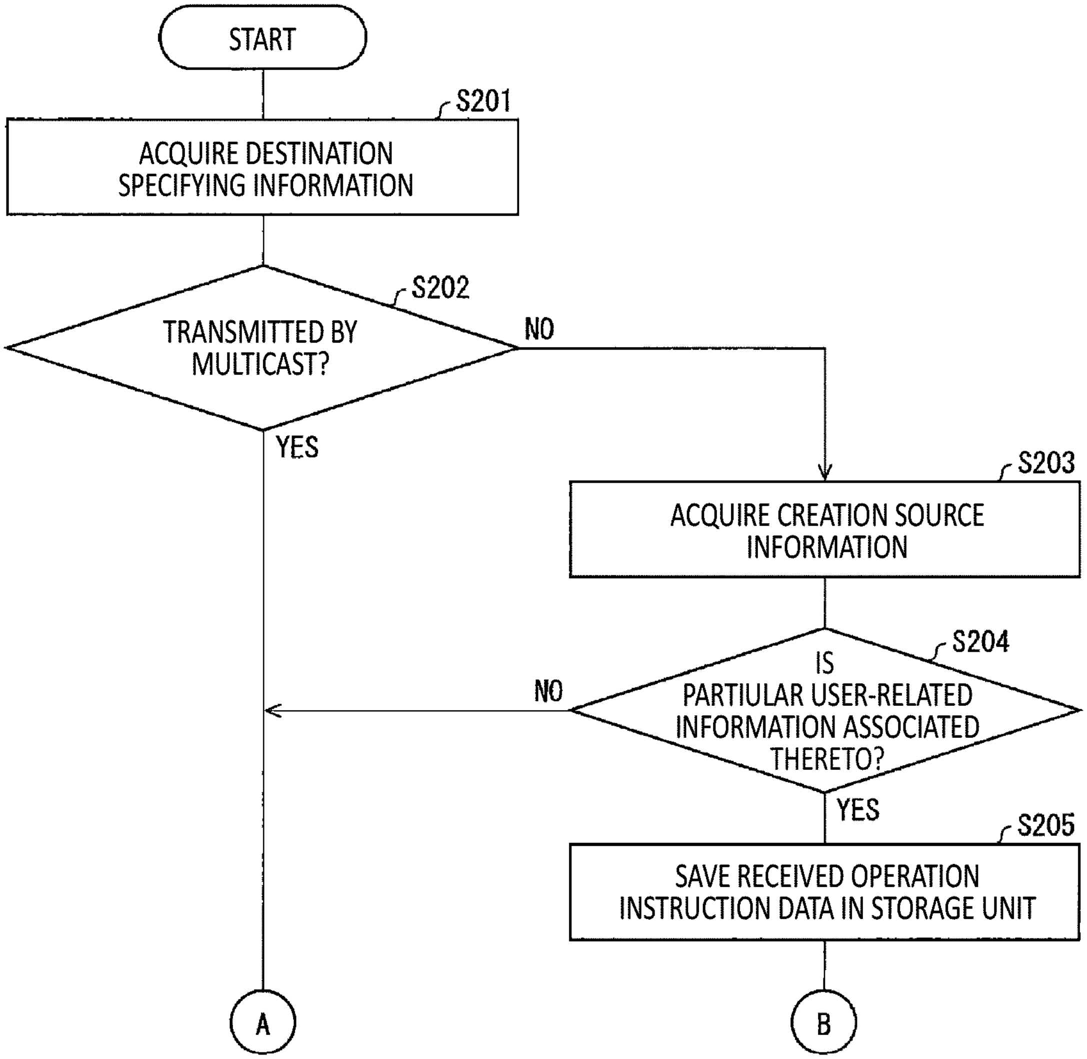
FIG. 12 is a flowchart illustrating a process flow for analyzing the operation instruction data that is executed by the user terminal.

FIG. 12 is a flowchart illustrating a process flow for analyzing the operation instruction data that is executed by the user terminal 100 according to the present embodiment. In the present embodiment, the processing executed by each apparatus of the game system 1 is almost similar to the processing shown in FIG. 10. At step S114, the user terminal 100 analyzes the operation instruction data, as illustrated below.

At step S201, the analyzing unit 116 acquires the destination specifying information from the item "destination" in the operation instruction data.

At step S202, the analyzing unit 116 determines whether said operation instruction data has been transmitted by multicast, based on the destination specifying information. In a case where the destination specifying information is directed to a group identifier (for example, "ALL" or the like), the analyzing unit 116 determines that said operation instruction data has been transmitted by multicast. The analyzing unit 116 then proceeds from YES at step S202 to step S115 and later steps shown in FIG. 10. That is, the game advancement unit 115 is triggered by reception of the operation instruction data transmitted by multicast at the local terminal to operate the character based on said operation instruction data in real-time. On the other hand, in a case where the destination specifying information is directed to an address of a local terminal, the analyzing unit 116 determines that said operation instruction data has been transmitted by unicast. In the present embodiment, the analyzing unit 116 may determine that it is not necessary to play those transmitted by unicast in real-time, save the received operation instruction data in the storage unit 120, and return to step S103 and later steps shown in FIG. 10. At step S103, the game advancement unit 115 may, for example, advance the part in which the character is operate according to an input manipulation of the user that is input to the user terminal 100. In another embodiment, when operation instruction data transmitted by unicast is received, the analyzing unit 116 may proceed from NO at step S202 to step S203.

At step S203, the analyzing unit 116 acquires the creation source information from the item "creation source" in said operation instruction data.

At step S204, the analyzing unit 116 determines whether the creation source information is directed to user-related information related to a particular user. The user-related information is, for example, the user ID, the terminal ID of the user terminal 100, the address of the user terminal 100, or the like. In a case where the creation source information is not the user-related information of a particular user, the analyzing unit 116 determines that said operation instruction data has been created by the game master, not the particular user. The analyzing unit 116 then proceeds from NO at step S204 to step S115 and later steps shown in FIG. 10. That is, the game advancement unit 115 is triggered by reception, at the local terminal, of the operation instruction data with which no user-related information is associated to operate the character based on said operation instruction data in real-time. On the other hand, in a case where the creation source information is user-related information of a particular user, the analyzing unit 116 determines that said operation instruction data has been created by the particular user. Therefore, the analyzing unit 116 determines that it is not necessary to play it in real-time since it is not operation instruction data supplied from the game master, and proceeds from YES at step S204 to step S205.

At step S205, the analyzing unit 116 saves the operation instruction data created by the particular user in the storage unit 120, and returns to step S103 and later steps shown in FIG. 10.

According to the configuration and the method described above, at the user terminal 100, in addition to operating the character according to an input manipulation of the user, the character can be operated based on the operation instruction data received from the server 200 or the operation instruction device 300. Therefore, the operation of the character becomes unconventional and the expression thereof expands significantly. In this manner, seeing the operation of the character, the user can feel a sense of reality as if said character exists in the real world. The user then feels a sense of attachment to the character through the experience interaction with said character with full of sense of reality, which allows the user to play another part in which said character is manipulated with more interest. As a result, a sense of immersion of the game world is enhanced, which leads to an effect of improving the amusement of said game.

<Variation>

In a variation of embodiment 2, the analyzing unit 116 may omit the step of determining whether the operation instruction data has been transmitted by multicast based on the destination specifying information, and execute a step of determining whether user-related information of a particular user is associated with the operation instruction data based on the creation source information.

Embodiment 3

<Game Overview>

The game (hereinafter, the present game) executed by the game system 1 according to embodiment 3 is a life simulation game including an element of a dating simulation game, as an example, similar to embodiment 1 and embodiment 2. In the present embodiment, the present game at least includes a live distribution part. The present game may be constituted by a single live distribution part, or may be constituted by a plurality of parts. In an example, it may be constituted by a combination of the story part and the live distribution part, as shown in FIG. 3 and FIG. 11. In addition, in the live distribution part, the character whose operation is controlled by the operation instruction device 300 may be a PC or an NPC. For example, even a character that operates as an NPC in the live distribution part may operate in accordance with an input manipulation of the user, who is the game player, as a PC in another part. Alternatively, the character may operate in accordance with the input manipulation of the user, who is the game player, as a PC in the live distribution part during a period where the operation instruction data is not live streamed from the operation instruction device 300. Once the live distribution has started, said character may then be switched to an NPC, and be operated in accordance with the operation instruction data supplied from the operation instruction device 300.

In the present embodiment, in particular, in the live distribution part, even once the real-time live distribution has ended, the user can request advancement of the live distribution part that has ended, and advance the live distribution part again based on the received operation instruction data. In this manner, the user can rewatch the live distribution again, and view the live distribution even when they had missed it. Hereinafter, through the first embodiment and the second embodiment and variations thereof, a scenario is assumed where a game including a story part and a live distribution part after said story part is advanced, and where the live distribution time has ended. In addition, it is assumed that the character here is an NPC that is not the target for direct manipulation by the user, who is the game player.

<Processing Overview>

In the present embodiment, the user terminal 100 is configured to execute the following steps to improve amusement of the game, based on the game program 131. Specifically, the user terminal 100 (computer) executes a step of requesting, via a manipulation unit such as the input unit 151, for example, advancement of the live distribution part that has ended, a step of receiving, from the server 200 or the operation instruction device 300 (character control device), the recorded operation instruction data according to the live distribution part that has ended, and a step of advancing the live distribution part that has ended by operating the NPC based on the recorded operation instruction data. Here, the recorded operation instruction data includes the motion data and audio data input by the operator associated with the NPC. The operator includes, not only a model or a voice actor, but a worker who performs some kind of manipulation on the operation instruction device 300 (character control device) but does not include the user who is the game player. Note that, the recorded operation instruction data is preferably stored in the storage unit 200 of the server 200 or the storage unit 320 of the operation instruction device 300, and is preferably distributed to the user terminal 110 again according to a request from the user terminal 100.

In the present embodiment, preferably, according to the result of whether the user has advanced the live distribution part in real-time, the advancement of the live distribution part that has ended is made to be different based on the recorded operation instruction data. Specifically, in a case where it is determined that the user has a past record in advancing the live distribution part in real-time, the live distribution part which is similar to the live distribution part advanced in real-time by the user is preferably advanced again (rewatch distribution). For rewatch distribution, an optional advancement of the live distribution part is preferably executed. On the other hand, in a case where it is determined that the user does not have a past record in advancing the live distribution part in real-time, the live distribution part of a different advancement mode that is different from that advanced in real-time is preferably advanced (missed-program distribution). Here, a case where it is determined that there is no past record in missed-program distribution includes, for example, a case where the user had a right to receive the live distribution, but did not actually execute it even though the user was able to advance the live distribution part in real-time at the live distribution time. For missed-program distribution, restricted advancement of the live distribution part is preferably executed.

<Functional Configuration of Game System 1>

In the user terminal 100 according to the present embodiment, in a case where it is determined that the user has a past record in advancing the live distribution part in real-time, the analyzing unit 116 further receives and analyzes the user action history information in the live distribution part. The user action history information is a data set of records of the user's action that is accepted by input manipulation during advancement of the live distribution part, aside from the content of the recorded operation instruction data. The user action history information is preferably associated with the recorded operation instruction data, and is preferably stored in the storage unit 220 of the server 200 or the storage unit 320 of the operation instruction device 300. In addition to this, or instead of this, the user action history information may be stored in the storage unit 120 of the user terminal 100.

FIG. 13 illustrates an example of a data structure of the user action history information. The user action history information includes items such as the action duration, action type, and action detail of the action taken by the user in the live distribution part, for example, and is associated with the user ID for identifying the user. The item "action duration" is time information of the action taken by the user in the live distribution part, and the item "action type" is the type indicating the action of the user, and the item "action detail" is the specific content of the action of the user. For example, actions to be identified by the items "action type" and "action detail" may include actions such as consumption of valuable data by the user's input manipulation (in an example, social tipping, payment for item purchase and the like), comment input, and changing of items such as clothing of the character (so-called change of clothes). In addition, such action may include selection of time for playing-back a particular advancement portion of the live distribution part later. Other than this, such action may include acquisition of rewards, points or the like during the live distribution part. Note that, the user action history information is preferably mutually associated between the data structure of the operation instruction data described in FIG. 4 and the data structure of the gaming information described in FIG. 5. Note that, it should be understood by those skilled in the art that these data structures are merely illustrative and it is not limited thereto.

<Process Flow>

Figure 14:
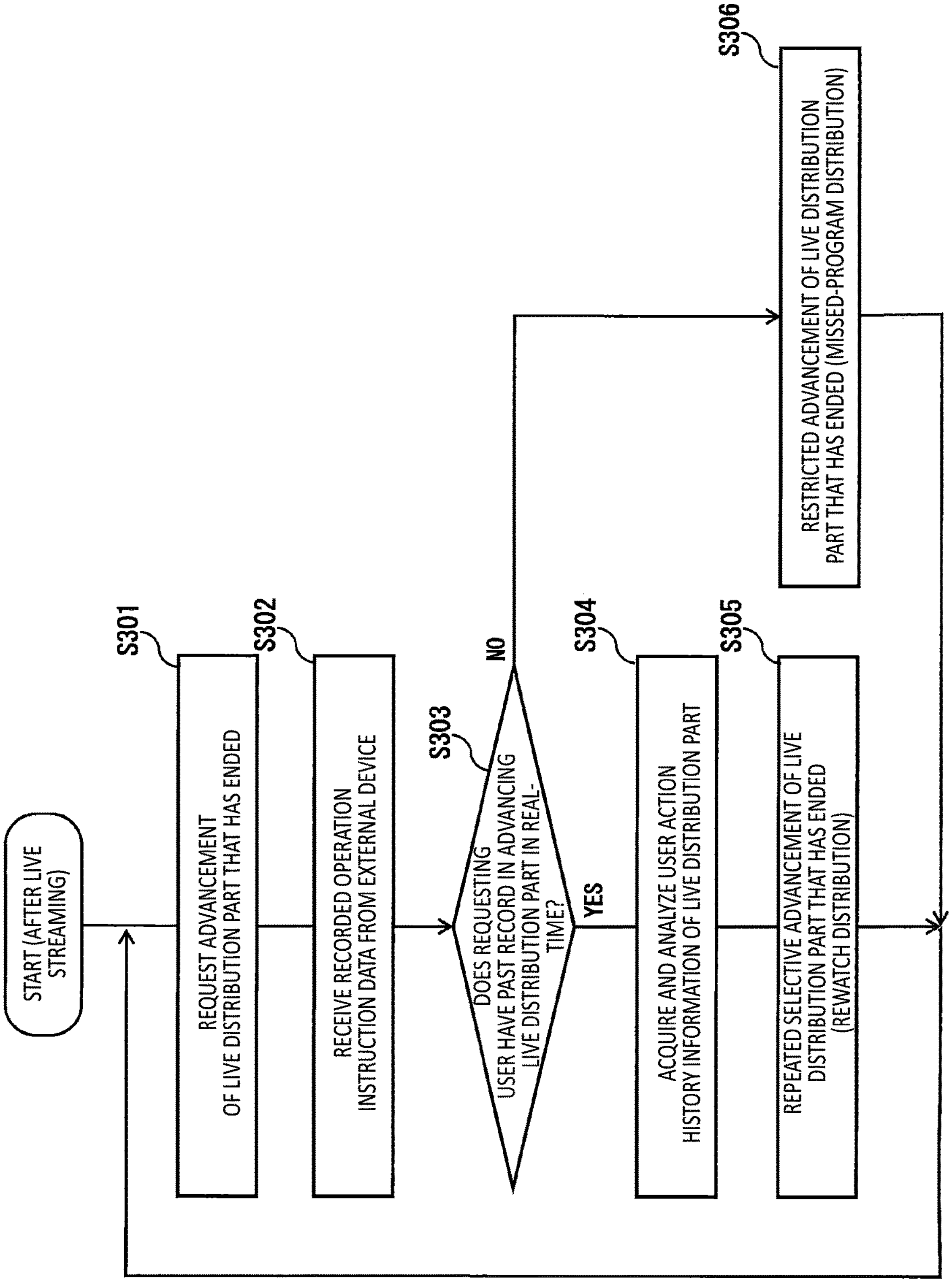
FIG. 14 is a flowchart illustrating an example of a basic game advancement for a game that is executed based on the method according to the present embodiment.

FIG. 14 is a flowchart illustrating an example of a basic game advancement for a game that is executed based on the game program according to the present embodiment. The process flow applied to a scene after the live distribution time where the live distribution part in real-time has already ended.

At step S301, advancement of the live distribution part that has ended is newly requested by the manipulation unit 151 of the user terminal 100. At step S302, in response to the request in step S301, the user terminal 100 receives the recorded operation instruction data according to the ended live distribution part from the server 200 or the operation instruction device 300 (character control device).

Next, at step S303, the game advancement unit 115 determines whether the user has a past record in advancing the live distribution part in real-time. The determination may be performed based on whether there is a record of the operation instruction data being transmitted to the user terminal 100, by referring to the item "destination" shown in FIG. 4, for example. Alternatively, it may either be performed based on the live distribution part being in a "played" status, by referring to the item "play history" shown in FIG. 5, or may be performed based on whether there is a past record of the live distribution by the character in the past, by referring to the item "distribution history" shown in FIG. 5. Other than this, in a case where the already recorded operation instruction data is stored in the storage unit 120 of the user terminal 100, it may be determined that the live distribution part has already been advanced in real-time. In addition, the determination may be performed in combination of these, or may be performed by any other method.

When it is determined that the user has a past record in advancing the live distribution part in real-time at step S303 (YES), the advancement of the live distribution part that has ended becomes "rewatch distribution". On the other hand, when it is determined that the user does not have a past record in advancing the live distribution part in real-time at step S303 (NO), the advancement of the live distribution part that has ended becomes "missed-program distribution". As described above, the user experience is different for "rewatch distribution" and "missed-program distribution".

At step S303, when it is determined that the user has a past record of advancing the live distribution part in real-time, the process flow proceeds from YES at step S303 to step S304. At step S304, the analyzing unit 116 acquires and analyzes the user action history information of the live distribution part shown in FIG. 13. The user action history information may be acquired from the server 200 or the operation instruction device 300, or in a case where it is already stored in the storage unit 120 of the user terminal 100, it may be used directly.

Subsequently, at step S305, the game advancement unit 115 executes repeated advancement of the live distribution part that has ended (that is, the "rewatch distribution" described above). Specifically, by using the recorded operation instruction data and the user action history information analyzed at step S304, the repeated advancement of the live distribution part is executed. In addition, in a case where the user has acquired a reward described in FIG. 8 as an item (here, a "rabbit-ear band"), the NPC is operated based on said item (that is, wearing the rabbit-ear band). In this manner, the repeated advancement of the live distribution part may be executed. That is, the repeated advancement of the live distribution part has the user action history information and information on the reward reflected thereto, and is similar to the live distribution part advanced in real-time, and is unique to the user at the same time.

In addition, for the rewatch distribution, the repeated advancement of the live distribution part is preferably executed optionally in accordance with specification of time information by the user's input manipulation via the manipulation unit, that is recorded when the advancement is performed for the first time. Specifically, by using the "action duration" data included in the user action history information described in FIG. 13, the user can specify particular action duration, and optionally advance the live distribution part therefrom. For example, in a case where the user has input a comment two minutes and 45 seconds after the live distribution part started, that timing at two minutes and 45 seconds later is specified, and the user can repeatedly advance the live distribution part. Note that, such repeated advancement is preferably executable based on the "action duration" corresponding to records of actions such as consumption of valuable data by the user's input manipulation and change of items such as clothing of the character, in addition to the record of comment input described above.

Further, for the rewatch distribution, in a case where the particular advancement portion is selected by the user's input manipulation during the live distribution part advanced in real-time, only the selected particular advancement portion of can be optionally advanced in the repeated advancement of the live distribution part. In this manner, the user can efficiently playback only the particular advancement portion of the live distribution part later. Specifically, in a case where the user has selected the particular advancement portion and a record of such action is registered in the user action history information, the live distribution part can be optionally advanced by using that action duration data. For example, when a user has selected a period between the start of the live distribution part from two minutes and 45 seconds to five minutes and 10 seconds, the user can repeatedly advance the live distribution part for that period.

Returning to FIG. 14, at step S303, when it is determined that the user does not have a past record of advancing the live distribution part in real-time, the process flow proceeds from NO at step S303 to step S306. At step S306, the game advancement unit 115 executes restricted advancement of the live distribution part that has ended (that is, the "missed-program distribution" described above). It is based on the idea that the user does not necessarily need to be presented with replication of the entire live distribution because it can be considered that the user had the right to receive the live distribution but waived this right, that this missed-program distribution is made to be a restricted one.

Specifically, for the missed-program distribution, the advancement of the live distribution part is executed by using the recorded operation instruction data. As described above, in a case where the user has acquired a reward as an item (a "rabbit-ear band" in FIG. 8) through the scenario associated with the story part, in the live distribution part advanced in real-time, image synthesis was performed such that the NPC is operated while waring that item. That is, the operation mode of the NPC had the reward associated therewith. However, for the missed-program distribution, unlike such live distribution part advanced in real-time, the operation mode of the NPC does not have a reward associated therewith. That is, image synthesis processing such that the NPC is operated while wearing the item is not performed. That is, advancement of the live distribution part that has ended does not have information on the reward reflected thereto, so it is a restricted one in that it is not unique to the user.

In addition, for the missed-program distribution, unlike the live distribution part advanced in real-time, acceptable actions of a user is preferably also restricted. Specifically, for the live distribution part advanced in real-time, consumption of valuable data by the user's input manipulation (in an example, social tipping and payment for item purchase or the like) was acceptable. On the other hand, for the advancement of the live distribution part that has ended, acceptance of such consumption of valuable data may be restricted.

Further, for the missed-program distribution, unlike the live distribution part advanced in real-time, even in a case where a particular scenario associated with the live distribution part is played, acquisition of predetermined game points may be restricted. Specifically, in the live distribution part advanced in real-time, as a result of the user playing the particular scenario, predetermined game points can be associated to the user to be added to the points owned by the user. On the other hand, in the advancement of the live distribution part that has ended, such points may not be associated to the user. As a result of the points not being added to the points owned by the user, in a case of a game in which a plurality of users, who are the game players, are ranked based on points, for example, even if a user advances a live distribution part that has ended, it will not impact such rankings.

According to the configuration and method described above, in the user terminal 100, even after the live distribution part has been advanced in real-time, the user can repeatedly advance the live distribution part in various modes. In this manner, the user will feel a sense of attachment to the character through the experience interaction with said character with full of sense of reality, which allows the user to play another part in which said character is manipulated with more interest. As a result, a sense of immersion of the game world is enhanced, which leads to an effect of improving the amusement of said game.

<Variations>

In embodiment 3, whether advancement of a live distribution part that has ended becomes a rewatch distribution or a missed-program distribution is decided based on whether the user has a past record in advancing the live distribution part in real-time (step S303 in FIG. 14). Contrarily, in a variation of the present embodiment, it may be configured such that the user can select between rewatch distribution or missed-program distribution.

<Implementation Examples by Software>

Control blocks of the control unit 110 (in particular, the operation accepting unit 111, the display control unit 112, the UI control unit 113, the animation generation unit 114, the game advancement unit 115, the analyzing unit 116 and the progress information generation unit 117), control blocks of the control unit 210 (in particular, the advancement assistance unit 211 and the sharing assistance unit 212), and control blocks of the control unit 310 (in particular, the operation accepting unit 311, the display control unit 312, the UI control unit 313, the animation generation unit 314, the progress simulating unit 315, the character control unit 316, and the reaction processing unit 317) may be implemented by a logic circuit (hardware) formed on an integrated circuit (IC chip) or the like, or may be implemented by a software by using a CPU (central processing unit).

In the latter case, the control unit 110, the control unit 210 or the control unit 310, or a information processing device including a plurality thereof includes a CPU that executes an instruction of a program which is a software for implementing each functionality, a ROM (read only memory) or a storage device (referred to as a "recording medium" or a "computer readable medium) having recorded thereon, in a computer readable manner by a computer (or a CPU), the program and various types of data, RAM (random access memory) that develops the program, and the like. The computer (or the CPU) reads and executes the program from the recording medium, thereby the purpose of the present invention is achieved. A "tangible medium that is not temporary", such as, for example, a tape, a disk, a card, a semiconductor memory, a programmable logic circuit can be used as the recording medium. In addition, the program may be supplied to the computer via any transmission medium (communication network, broadcast wave or the like) that is capable of transmitting said program. Note that an aspect of the present invention may be achieved in a form of a data signal embedded in a carrier wave which is realized when the program is realized by electronic transmission. That is, a computer readable medium having stored thereon a computer executable instruction causes the processor to execute the steps of the method described in each embodiment described above, when the computer executable instruction is executed.

The present invention is not limited to each embodiment described above, and various changes within the scope indicated in the claims are allowed. Embodiments obtained by combining technical means disclosed in each of the different embodiments as required are also included in the technical scope of the present invention.

[Supplementary Information]

The content according to an aspect of the present invention is listed below.

(Item 1)

A method for advancing a game by a computer (a user terminal 100) including a processor (10), a memory (11), and a manipulation unit (a communication IF 13, a input and output IF 14, a touch screen 15, a camera 17, a distance measuring sensor 18, an input unit 151 or the like) is described. According to an aspect of the present disclosure, the method includes a step (step S1*a*) of executing, by the processor, advancement of a first part by operating a non player character (hereinafter, NPC) which is not a target for direct manipulation by a user who is a game player, based on first operation instruction data prestored in the memory for specifying an operation of the NPC, and by responding to an input manipulation of the user via the manipulation unit; a step (step S13*a*) of accepting, by the processor, a particular action by the user in the first part, wherein the game is switched from the first part (story part) to a second part (live distribution part) according to a result of the particular action; and a step (step S5*a*) of executing, by the processor, first advancement of the second part by operating the NPC based on second operation instruction data distributed from an external device (the server 200 or the operation instruction device 300), wherein the second operation instruction data includes motion data and audio data being input by an operator associated with the NPC which is not a target for direct manipulation by the user.

According to the configuration described above, in the first part, in addition to operating the NPC based on first operation instruction data that is prepared in advance, the second operation instruction data is received from the character control device, and in the second part, the NPC is operated based on the second operation instruction data. Since the NPC can be operated based on the second operation instruction data received from the character control device, the operation of the NPC becomes unconventional and the expression thereof expands significantly. Therefore, through the interaction with the NPC, the user can feel a sense of reality as if said NPC exists in the real world. As a result, a sense of immersion of the game world is enhanced, which leads to an effect of improving the amusement of said game. In addition, since the user needs to perform the particular action in the first part in order to transition to the second part, the gaming element can be further enhanced.

(Item 2)

In (item 1), the computer further includes a position registration system, and a result of the particular action includes that a position of the computer acquired by the position registration system in the first part becomes a predetermined position. In this manner, the user needs to perform the particular action in the first part in order to transition to the second part. As a result, the gaming element can be further enhanced.

(Item 3)

In (item 1) or (item 2), a result of the particular action includes that a predetermined scenario associated with the first part is concluded. In this manner, the user needs to perform the particular action in the first part in order to transition to the second part. As a result, the gaming element can be further enhanced.

(Item 4)

In any one of (item 1) to (item 3), the method further includes a step (step S301) of requesting, by the processor, second advancement of the second part after first advancement of the second part, and a step (step S305) of executing the second advancement of the second part by operating the NPC based on the second operation instruction data distributed again from the external device in response to the step of requesting. In this manner, the user can rewatch the live distribution again.

(Item 5)

In (item 4), the second advancement of the second part is executed based on the second operation instruction data and a record of an action by an input manipulation of the user accepted during the first advancement of the second part. In this manner, the user can rewatch the live distribution again in a pinpoint manner.

(Item 6)

In (item 5), the record of the action includes time information, and the second advancement of the second part follows specification of the time information by an input manipulation of the user via the manipulation unit during the first advancement of the second part. In this manner, the user can rewatch the live distribution again in a pinpoint manner.

(Item 7)

In (item 5) or (item 6), the action includes selection of a particular advancement portion by an input manipulation of the user via the manipulation unit during the first advancement of the second part, and advancement of only the particular advancement portion that has been selected is executed during the second advancement of the second part. In this manner, the user can rewatch the live distribution again in a pinpoint manner.

(Item 8)

A method for advancing a game by a computer (a user terminal 100) including a processor (10), a memory (11), and a manipulation unit (a communication IF 13, a input and output IF 14, a touch screen 15, a camera 17, a distance measuring sensor 18, an input unit 151 or the like) is described. According to an aspect of the present disclosure, the method includes a step (step 1, la) of executing, by the processor, advancement of a first part (story part) by operating a non player character (hereinafter, NPC) which is not a target for direct manipulation by a user who is a game player, based on first operation instruction data prestored in the memory for specifying an operation of the NPC, and by responding to an input manipulation of the user via the manipulation unit, a step (step S301) of requesting, by the processor, advancement of a second part (live distribution part) that has ended, a step (step S302) of receiving, by the processor from an external device (a server 200 or a operation instruction device 300), second operation instruction data that has been recorded, wherein the second operation instruction data includes motion data and audio data input by an operator associated with the NPC which is not a target for direct manipulation by the user, and a step (step S305, 306) of executing, by the processor, advancement of the second part (live distribution part) by operating the NPC which is not a target for direct manipulation by the user, based on the second operation instruction data.

According to the configuration described above, in the user terminal 100, even after the live distribution part has been advanced in real-time, the user can repeatedly advance the live distribution part in various modes. In this manner, the user will feel a sense of attachment to the character through the experience interaction with said character with full of sense of reality, which allows the user to play another part in which said character is manipulated with more interest. As a result, a sense of immersion of the game world is enhanced, which leads to an effect of improving the amusement of said game.

(Item 9)

In (item 8), after the first part, based on the second operation instruction data, the second part for operating the NPC in a real-time manner is enabled to advance in a real-time manner (step S5, S5*a*), and advancement modes of the advancement of the second part in a real-time manner and the advancement of the second part that has ended are different. In this manner, the live distribution that would not have been able to be watched once it was missed conventionally can be watched again by the user, although restricted.

(Item 10)

In (item 9), in the advancement of the second part in a real-time manner, an operation mode of the NPC can be associated with a reward that is acquired through a scenario associated with the first part, and in the advancement of the second part that has ended, an operation mode of the NPC is not associated with the reward. In this manner, the live distribution that would not have been able to be watched once it was missed conventionally can be watched again by the user, although restricted.

(Item 11)

In (item 9) or (item 10), in the advancement of the second part that has ended, consumption of valuable data by an input manipulation of the user via the manipulation unit is not accepted. In this manner, the live distribution that would not have been able to be watched once it was missed conventionally can be watched again by the user, although restricted.

(Item 12)

In any one of (item 9) to (item 11), in the advancement of the second part in a real-time manner, points can be associated with a result of a play of a scenario associated with the second part, and in the advancement of the second part that has ended, the points are not associated with a result of the play. In this manner, the live distribution that would not have been able to be watched once it was missed conventionally can be watched again by the user, although restricted.

(Item 13)

A computer readable medium having stored thereon computer executable instructions is described. According to an aspect of the present disclosure, the computer readable medium causes the processor to execute the steps included in the method according to any one of (item 1) to (item 12), when the computer executable instructions are executed. The computer readable medium according to (item 13) provides similar effects as the method according to (item 1) to (item 12).

(Item 14)

An information processing device (user terminal 100) for advancement of a game is described. According to an aspect of the present disclosure, the information processing device includes a first part advancement unit for executing advancement of a first part by operating a non player character (hereinafter, NPC) which is not a target for direct manipulation by a user who is a game player, based on first operation instruction data prestored in the memory for specifying an operation of the NPC, and by responding to an input manipulation of the user via the manipulation unit, an accepting unit for accepting a particular action by the user in the first part, wherein the game is switched from the first part to a second part according to a result of the particular action, and a second part advancement unit for executing advancement of the second part by operating the NPC based on second operation instruction data distributed from an external device, wherein the second operation instruction data includes motion data and audio data being input by an operator associated with the NPC which is not a target for direct manipulation by the user. The method according to (item 14) provides similar effects as the method according to (item 1).

EXPLANATION OF REFERENCES

1: game system; 2: network; 10, 20, 30: processor; 11, 21, 31: memory; 12, 22, 32: storage; 13, 23, 33: communication IF (manipulation unit); 14, 24, 34: input and output IF (manipulation unit); 15, 35: touch screen (display unit, manipulation unit); 17: camera (manipulation unit); 18] distance measuring sensor (manipulation unit), 100: user terminal (computer, information processing device); 110, 113, 210, 310: control unit; 111, 311: operation accepting unit; 112, 312: display control unit; 113, 313: UI control unit; 114, 314: animation generation unit; 115: game advancement unit; 116: analyzing unit; 117: progress information generation unit; 120, 220, 320: storage unit; 131: game program; 132: gaming information; 133: user information; 134: character control program; 151, 351: input unit (manipulation unit); 152, 352: display unit; 200: server (computer); 211: advancement assistance unit; 212: sharing assistance unit; 300: operation instruction device (NPC control device, character control device); 315: progress simulating unit; 316: character control unit; 317: reaction processing unit; 1010: object; 1020, 3030: controller; 1030: storage media; 3010: microphone; 3020: motion capture device.

What is claimed is:

1. A method for advancement of a game by a computer having a processor, a memory, and a manipulation unit, the method comprising:

executing, by the processor, advancement of a first part by operating a non player character (hereinafter, NPC) which is not a target for direct manipulation by a user who is a game player, based on first operation instruction data prestored in the memory for specifying an operation of the NPC, and by responding to an input manipulation of the user via the manipulation unit;

accepting, by the processor, a particular action by the user in the first part, wherein the game is switched from the first part to a second part according to a result of the particular action; and executing, by the processor, first advancement of the second part by operating the NPC based on second operation instruction data distributed from an external device, wherein the second operation instruction data includes motion data and audio data being input by an operator associated with the NPC which is not a target for direct manipulation by the user.

2. The method according to claim 1, wherein the computer further has a position registration system, wherein a result of the particular action includes that a position of the computer acquired by the position registration system in the first part becomes a predetermined position.

3. The method according to claim 1, wherein a result of the particular action includes that a predetermined scenario associated with the first part is concluded.

4. The method according to claim 2, wherein a result of the particular action includes that a predetermined scenario associated with the first part is concluded.

5. The method according to claim 1, further comprising:

requesting, by the processor, second advancement of the second part after first advancement of the second part; and executing, by the processor, the second advancement of the second part by operating the NPC based on the second operation instruction data distributed again from the external device in response to the requesting.

6. The method according to claim 2, further comprising:

requesting, by the processor, second advancement of the second part after first advancement of the second part; and executing, by the processor, the second advancement of the second part by operating the NPC based on the second operation instruction data distributed again from the external device in response to the requesting.

7. The method according to claim 3, further comprising:

requesting, by the processor, second advancement of the second part after first advancement of the second part; and executing, by the processor, the second advancement of the second part by operating the NPC based on the second operation instruction data distributed again from the external device in response to the requesting.

8. The method according to claim 5, wherein the second advancement of the second part is executed based on the second operation instruction data and a record of an action by an input manipulation of the user accepted during the first advancement of the second part.

9. The method according to claim 8, wherein the record of the action includes time information, and wherein the second advancement of the second part follows specification of the time information by an input manipulation of the user via the manipulation unit during the first advancement of the second part.

10. The method according to claim 8, wherein the action includes selection of a particular advancement portion by an input manipulation of the user via the manipulation unit during the first advancement of the second part, and advancement of only the particular advancement portion that has been selected is executed during the second advancement of the second part.

11. The method according to claim 9, wherein the action includes selection of a particular advancement portion by an input manipulation of the user via the manipulation unit during the first advancement of the second part, and advancement of only the particular advancement portion that has been selected is executed during the second advancement of the second part.

12. A method for advancement of a game by a computer having a processor, a memory, and a manipulation unit, the method comprising:

executing, by the processor, advancement of a first part by operating a non player character (hereinafter, NPC) which is not a target for direct manipulation by a user who is a game player, based on first operation instruction data prestored in the memory for specifying an operation of the NPC, and by responding to an input manipulation of the user via the manipulation unit;

requesting, by the processor, advancement of a second part that has ended;

receiving, by the processor from an external device, second operation instruction data that has been recorded, wherein the second operation instruction data includes motion data and audio data input by an operator associated with the NPC which is not a target for direct manipulation by the user; and executing, by the processor, advancement of the second part by operating the NPC which is not a target for direct manipulation by the user, based on the second operation instruction data.

13. The method according to claim 12, wherein after the first part, based on the second operation instruction data, the second part for operating the NPC in a real-time manner is enabled to advance in a real-time manner, and advancement modes of the advancement of the second part in a real-time manner and the advancement of the second part that has ended are different.

14. The method according to claim 13, wherein in the advancement of the second part in a real-time manner, an operation mode of the NPC can be associated with a reward that is acquired through a scenario associated with the first part, and in the advancement of the second part that has ended, an operation mode of the NPC is not associated with the reward.

15. The method according to claim 13, wherein in the advancement of the second part that has ended, consumption of valuable data by an input manipulation of the user via the manipulation unit is not accepted.

16. The method according to claim 14, wherein in the advancement of the second part that has ended, consumption of valuable data by an input manipulation of the user via the manipulation unit is not accepted.

17. The method according to claim 13, wherein in the advancement of the second part in a real-time manner, points can be associated with a result of a play of a scenario associated with the second part, and in the advancement of the second part that has ended, the points are not associated with a result of the play.

18. The method according to claim 14, wherein in the advancement of the second part in a real-time manner, points can be associated with a result of a play of a scenario associated with the second part, and in the advancement of the second part that has ended, the points are not associated with a result of the play.

19. A non-transitory computer readable medium having stored thereon computer executable instructions, wherein when the computer executable instructions are executed, the processor is caused to execute the steps included in the method according to claim 1.

20. An information processing device for advancement of a game, comprising:

at least one processor;

a first part advancement unit that uses the at least one processor to advance a first part by operating a non player character (hereinafter, NPC) which is not a target for direct manipulation by a user who is a game player, based on first operation instruction data prestored in a memory for specifying an operation of the NPC, and by responding to an input manipulation of the user via the manipulation unit;

an accepting unit that uses the at least one processor to accept a particular action by the user in the first part, wherein the game is switched from the first part to a second part according to a result of the particular action; and a second part advancement unit that uses the at least one processor to advance the second part by operating the NPC based on second operation instruction data distributed from an external device, wherein the second operation instruction data includes motion data and audio data being input by an operator associated with the NPC which is not a target for direct manipulation by the user.

* * * * *